United States Patent
Xue et al.

(10) Patent No.: US 12,229,414 B2
(45) Date of Patent: Feb. 18, 2025

(54) PROCESSING AND ARCHIVING DATA FROM EDGE NODES ACROSS DISTRIBUTED SYSTEMS

(71) Applicant: International Business Machines Corporation, Armonk, NY (US)

(72) Inventors: Feng Xue, Singapore (SG); Jeffrey G. Komatsu, Kasson, MN (US); John Scott Bacon, Rochester, MN (US); Aaron Civil, Rochester, MN (US); Julian Reyes, Rochester, MN (US); Jun Jiang, Wuhan (CN); Lei Yang, Dalian (CN); Ding Guo Xiong, Wuhan (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/221,283

(22) Filed: Jul. 12, 2023

(65) Prior Publication Data
US 2025/0021236 A1    Jan. 16, 2025

(51) Int. Cl.
*G06F 3/06*    (2006.01)

(52) U.S. Cl.
CPC .......... *G06F 3/0619* (2013.01); *G06F 3/0659* (2013.01); *G06F 3/067* (2013.01)

(58) Field of Classification Search
CPC ....... G06F 3/0619; G06F 3/0659; G06F 3/067
USPC ................................. 711/154, 100
See application file for complete search history.

(56) References Cited

U.S. PATENT DOCUMENTS

| | | | |
|---|---|---|---|
| 8,010,559 | B2 | 8/2011 | Verma et al. |
| 9,646,024 | B2 | 5/2017 | Srivas et al. |
| 10,095,708 | B2 | 10/2018 | Passey et al. |
| 10,326,766 | B2 | 6/2019 | Egner et al. |
| 10,423,609 | B1 | 9/2019 | Strauss |
| 10,474,636 | B2 | 11/2019 | Strauss et al. |

(Continued)

FOREIGN PATENT DOCUMENTS

| | | |
|---|---|---|
| DE | 112019000841 T5 | 11/2020 |
| JP | 4148915 B2 | 9/2008 |
| JP | 5272098 B2 | 8/2013 |

OTHER PUBLICATIONS

Hung et al., "CSM-DBEN: Container Storage Manager for Data Backup on Edge Nodes," IEEE International Conference on Cloud Computing Technology and Science (CloudCom), 2022, pp. 105-112.

(Continued)

*Primary Examiner* — Hosain T Alam
*Assistant Examiner* — Zubair Ahmed
(74) *Attorney, Agent, or Firm* — Zilka-Kotab, P.C.

(57) ABSTRACT

A computer-implemented method, according to one approach, includes: detecting new data generated at a first edge node, and causing a first copy of the new data to be transferred to a central data storage location in real-time. A second copy of the new data is also stored in a first location at the first edge node. In response to a predetermined condition being met, a determination is made as to whether any information in the first copy of the new data transferred is missing at the central data storage location. The first copy of the new data is removed from the first location at the first edge node in response to determining that no information in the first copy of the new data transferred is missing at the central data storage location.

25 Claims, 8 Drawing Sheets

(56) References Cited

U.S. PATENT DOCUMENTS

| | | |
|---|---|---|
| 10,545,927 B2 | 1/2020 | Strauss et al. |
| 10,789,020 B2 | 9/2020 | Karr et al. |
| 10,936,238 B2 | 3/2021 | Power et al. |
| 10,979,383 B1 | 4/2021 | Warfield et al. |
| 11,096,036 B2 | 8/2021 | Poornachandran et al. |
| 11,159,609 B2 | 10/2021 | McGrath et al. |
| 11,307,998 B2 | 4/2022 | Irwin et al. |
| 11,354,058 B2 | 6/2022 | Bernat et al. |
| 11,558,253 B2 | 1/2023 | Peng |
| 2002/0078174 A1* | 6/2002 | Sim ................ H04L 67/1008 709/219 |
| 2010/0228819 A1 | 9/2010 | Wei |
| 2010/0257140 A1 | 10/2010 | Davis et al. |
| 2013/0073808 A1* | 3/2013 | Puthalath ............ H04L 67/568 711/119 |
| 2015/0161226 A1* | 6/2015 | Lipstone ................ H04N 21/24 707/603 |
| 2015/0227550 A1 | 8/2015 | Matsuki et al. |
| 2018/0146041 A1* | 5/2018 | Moustafa .............. H04L 47/286 |
| 2019/0251279 A1 | 8/2019 | Emberson et al. |
| 2020/0007414 A1 | 1/2020 | Smith et al. |
| 2021/0021563 A1* | 1/2021 | Hegde .................. H04L 47/286 |
| 2021/0099848 A1 | 4/2021 | Ruan et al. |
| 2021/0144517 A1 | 5/2021 | Guim Bernat et al. |
| 2022/0137876 A1 | 5/2022 | Chung et al. |

OTHER PUBLICATIONS

International Search Report and Written Opinion from PCT Application No. PCT/EP2024/068593, dated Nov. 11, 2024, 13 pages.

* cited by examiner

PROCESSING AND ARCHIVING DATA FROM EDGE NODES ACROSS DISTRIBUTED SYSTEMS

BACKGROUND

The present invention relates to distributed storage systems, and more specifically, this invention relates to processing and archiving data across distributed storage systems.

As computing power continues to advance and the use of IoT devices becomes more prevalent, the amount of data produced continues to increase. For instance, the rise of smart enterprise endpoints has led to large amounts of data being generated at remote locations. Data production will only further increase with the growth of 5G networks and an increased number of connected devices. This issue has also become more prevalent as the complexity of machine learning models increases. Increasingly complex machine learning models translate to more intense workloads and increased strain associated with applying the models to received data. The operation of conventional implementations has thereby been negatively impacted.

While cloud computing has been implemented in conventional systems in an effort to improve the ability to process this increasing amount of data, the unprecedented scale and complexity at which data is being created has outpaced network and infrastructure capabilities. Sending all device-generated data to a centralized data center or to a cloud location has resulted in bandwidth and latency issues in conventional systems.

In an attempt to combat this reliance on a network to perform all processing at a central location, edge computing has been implemented to extend computing to the endpoints in a system. For instance, applications are moved to the edge locations where the data is generated. Accordingly, both structured and unstructured data is generated at the edge locations where the workloads are executed.

While edge computing has improved how data is processed, conventional systems have suffered from inefficiencies caused by how the data produced at these edge locations is maintained. These inefficiencies have resulted in both operation-based and security-based errors. For instance, it is undesirable for data produced and processed at an edge to be stored there, as doing so would involve consistent increment of storage at the edge. This is especially true for edge workloads that involve object detection and/or image classification, which generate large amounts of unstructured data.

Each edge node also becomes a single point of failure for the entire system, thereby significantly degrading the resiliency of the system. Should one of the edge nodes fail, not only are cached workloads at risk of permanent loss, but the data stored at the edge node is also at risk of permanent loss. Data generated at an edge is also often requested by downstream applications and reports.

However, allowing downstream applications and reports to access the data directly from the edge nodes has introduced significant security risks in these conventional systems. It follows that conventional systems have suffered from operational and performance based inefficiencies.

SUMMARY

A computer-implemented method, according to one approach, includes: detecting new data generated at a first edge node, and causing a first copy of the new data to be transferred to a central data storage location in real-time. A second copy of the new data is also stored in a first location at the first edge node. In response to a predetermined condition being met, a determination is made as to whether any information in the first copy of the new data transferred is missing at the central data storage location. The first copy of the new data is removed from the first location at the first edge node in response to determining that no information in the first copy of the new data transferred is missing at the central data storage location.

A computer program product, according to another approach, includes a computer readable storage medium having program instructions embodied therewith. The program instructions are readable by a processor, executable by the processor, or readable and executable by the processor, to cause the processor to: perform the foregoing method.

A system, according to yet another approach, includes: a first edge node connected to a central data storage location, and a processor. Logic is also integrated with the processor, executable by the processor, or integrated with and executable by the processor. Furthermore, the logic is configured to: perform the foregoing method.

A computer program product, according to another approach, includes a computer readable storage medium having program instructions embodied therewith. The program instructions are readable by a processor, executable by the processor, or readable and executable by the processor, to cause the processor to: receive a first copy of data from a first edge node. The first copy of data is stored in a first storage location at the central data storage location. A second copy of data is also received from a second edge node, and the second copy of data is stored in a second storage location at the central data storage location. A request may be received from the first edge node to determine whether the first storage location includes a mirrored duplicate of the first copy of data received from the first edge node. In response to determining that the first storage location includes a mirrored duplicate of the first copy of data, the first copy of data is released from the first edge node by sending an acknowledgement to the first edge node.

A system, according to still another approach, includes: a central data storage location connected to a first edge node and a second edge node. The system also includes a processor, and logic integrated with the processor, executable by the processor, or integrated with and executable by the processor. Wherein the logic is configured to: perform the method above.

Other aspects and implementations of the present invention will become apparent from the following detailed description, which, when taken in conjunction with the drawings, illustrate by way of example the principles of the invention.

DETAILED DESCRIPTION

Figure 1:
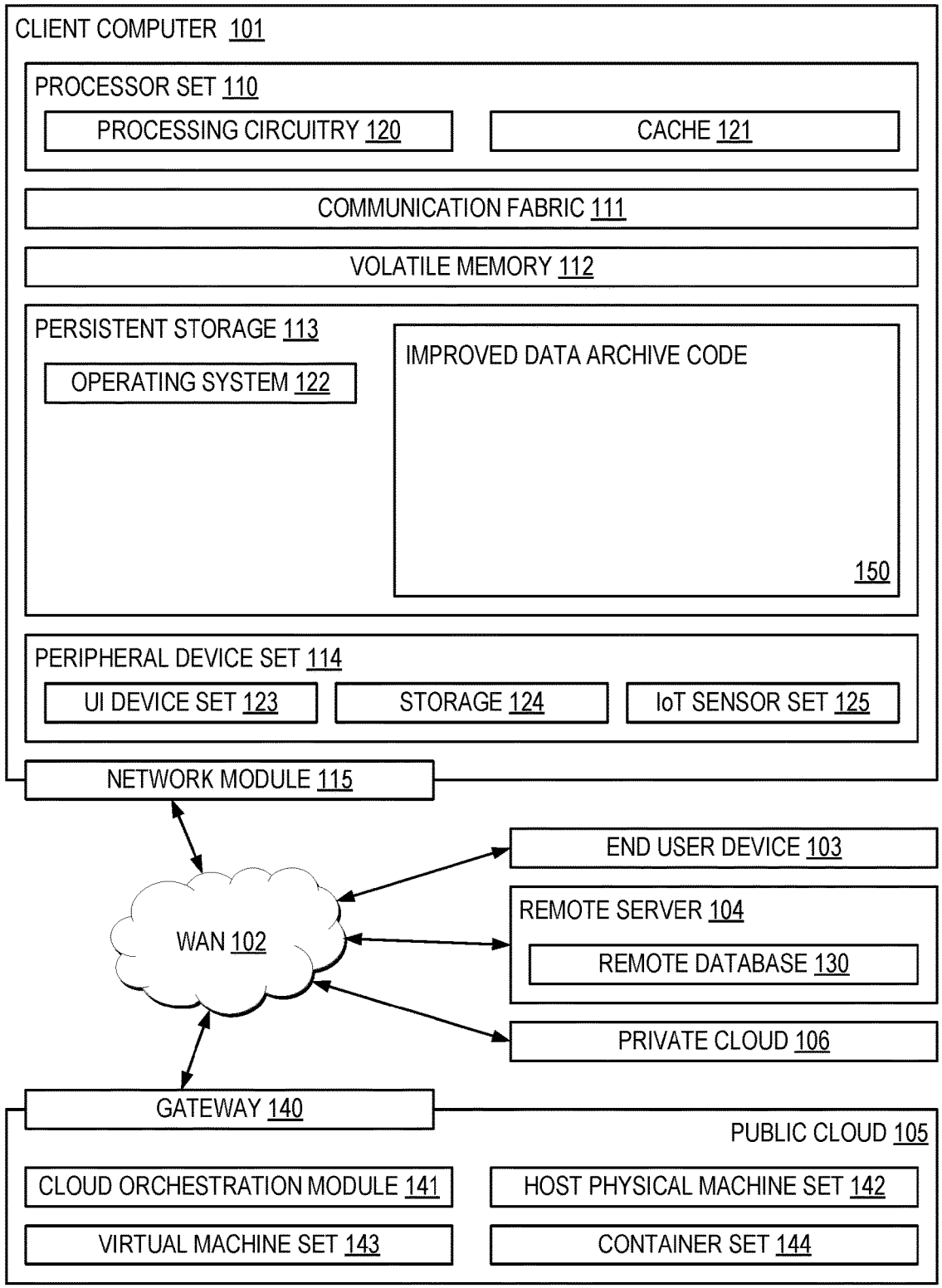
FIG. 1 is a diagram of a computing environment, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for maintaining a mirrored copy of the data that is received and/or produced at various edge nodes, thereby achieving an efficient and scalable data archive scheme across a distributed system. Maintaining a full copy of the data at a central and accessible location improves the efficiency at which the system is able to operate, by providing quicker access to data. Data produced at an edge node may be requested downstream at different locations of a distributed system, e.g., to perform additional processing. Accordingly, by sending copies of data to the central data storage location from the edge nodes in real-time as the data is received and/or generated, the central data storage location is able to satisfy operations and requests that pertain to data from one or more edge nodes, e.g., as will be described in further detail below.

In one general approach, a computer-implemented method includes: detecting new data generated at a first edge node. By detecting data newly generated at edge nodes, implementations herein can implement changes to a distributed system in real-time. This desirably allows for a mirrored copy of the data that is received and/or produced at various edge nodes to be maintained.

The computer-implemented method also includes causing a first copy of the new data to be transferred to a central data storage location in real-time. As noted above, implementations herein can implement changes to a distributed system in real-time. This desirably allows for a mirrored copy of the data that is received and/or produced at various edge nodes to be maintained. Implementations herein are thereby able to achieve an efficient and scalable data archive scheme across a distributed system in real-time. Accordingly, this scheme may be applied to various different types of implementations, e.g., such as enterprise edge node workloads. Approaches herein are also easily scalable, providing support to multiple edge nodes and multiple edge workloads, even in large enterprise settings.

The computer-implemented method also includes storing a second copy of the new data in a first location at the first edge node. By maintaining an additional copy of the new data locally at the first edge node, additional operations corresponding to this data may be performed at the first edge node locally and without accessing the central data storage location, thereby reducing latency and improving performance throughput.

The computer-implemented method also includes determining whether any information in the first copy of the new data transferred is missing at the central data storage location in response to a predetermined condition being met. Inspecting the copy stored at the central data storage location allows for the method to determine whether any portion(s) of the data were lost in transit to the central data storage location. Data loss in transit may result from communication errors, network shortages, write errors, etc. which impact a portion, or all of the data sent from the edge node. These situations may thereby be identified and rectified before deleting the first copy of the new data retained at the edge node.

The computer-implemented method further includes removing the first copy of the new data from the first location at the first edge node in response to determining that no information in the first copy of the new data transferred is missing at the central data storage location. Again, inspecting the copy stored at the central data storage location allows for the method to determine whether any portion(s) of the data were lost in transit to the central data storage location. Data loss in transit may result from communication errors, network shortages, write errors, etc. which impact a portion, or all of the data sent from the edge node. These situations may thereby be identified and rectified before deleting the first copy of the new data retained at the edge node. This desirably allows for a mirrored copy of the data that is received and/or produced at various edge nodes to be maintained in real-time. Implementations herein are thereby able to achieve an efficient and scalable data archive scheme across a distributed system. Maintaining a full copy of the data at a central and accessible location also significantly improves the efficiency at which the system as a whole is able to operate by providing quicker access to data.

In some implementations, the central data storage location is configured to receive and store one or more additional copies of data received from one or more additional edge nodes. As noted above, implementations herein are able to achieve an efficient and scalable data archive scheme across a distributed system in real-time. Accordingly, approaches herein are easily scalable, providing support to multiple edge nodes and multiple edge workloads, even in large enterprise settings. This further amplifies the improvements achieved herein, by providing faster access to a greater amount of data, improving the efficiency by which compute systems as a whole is able to operate.

In preferred implementations, the central data storage location is configured to maintain mirrored copies of data that is received at one or more additional edge nodes. Again, implementations herein are able to achieve an efficient and scalable data archive scheme across a distributed system that maintains mirrored copies of data in real-time. Accordingly, approaches herein are able to provide support to multiple edge nodes and multiple edge workloads, even in large enterprise settings. This reduces latency issues while also improving access to a greater amount of data, thereby improving the efficiency at which compute systems as a whole are able to operate.

In some implementations, it is determined that at least some information in the first copy of the new data is actually missing at the central data storage location, whereby the missing information is transferred to the central data storage location from the edge node. Again, inspecting the copy stored at the central data storage location allows for the method to determine whether any portion(s) of the data were lost in transit to the central data storage location. These situations may thereby be identified and rectified before deleting the first copy of the new data retained at the edge node. This desirably allows for a mirrored copy of the data that is received and/or produced at various edge nodes to be maintained in real-time.

The first copy of the new data may be removed from the first location in response to transferring the missing information to the central data storage location. Again, inspecting the copy stored at the central data storage location allows for the method to determine whether any portion(s) of the data were lost in transit to the central data storage location. These situations may thereby be identified and rectified before deleting the first copy of the new data retained at the edge node. This desirably allows for a mirrored copy of the data that is received and/or produced at various edge nodes to be maintained in real-time. Implementations herein are thereby able to achieve an efficient and scalable data archive scheme across a distributed system. Maintaining a full copy of the data at a central and accessible location also significantly improves the efficiency at which the system as a whole is able to operate by providing quicker access to data.

Some implementations implement an archive handler, which is configured to manage an edge file hierarchy at the edge node. The archive handler also includes a set of observer components and a remover component. Performance of a system is improved as a result of implementing an archive handler that can be easily deployed as a containerized edge workload to various edge nodes. This helps make data available for downstream consumption in real-time, while also protecting the edge node from unnecessary access. Data is kept available at the edge nodes as long as is desired, e.g., as determined in a number of different ways as described herein. This further minimizes the cost of storage at each of the edge nodes.

In some implementations, each observer in the set of observer components corresponds to a respective folder at the first edge node. Moreover, the new data generated at the first edge node is detected in response to receiving a notification from a respective one of the observer components. Again, implementing an archive handler and the observers that correspond thereto, allow implementations herein to improve performance of a system as a result of utilizing an archive handler that can be easily deployed as a containerized edge workload to various edge nodes. This helps make data available for downstream consumption in real-time, while also protecting the edge node from unnecessary access.

In other implementations, each one or more instructions are sent to the remover component of an archive handler to remove the first copy of the new data. The one or more instructions result in the remover component removing the first copy of the new data from the first location. As noted above, inspecting a copy of data stored at the central data storage location allows for the method to determine whether any portion(s) of the data were lost in transit to the central data storage location. These situations may thereby be identified and rectified before deleting the first copy of the new data retained at the edge node. This desirably allows for a mirrored copy of the data that is received and/or produced at various edge nodes to be maintained in real-time.

In still other implementations, meeting the predetermined condition includes maintaining the first copy of the new data in the first location at the first edge node for a first predetermined amount of time. In other words, a copy of data transferred to a central data storage location may be inspected after a predetermined amount of time has passed. Moreover, this predetermined amount of time is based at least in part on a type and/or amount of information included in the first copy of the new data. Inspecting the copy stored at the central data storage location allows for the method to determine whether any portion(s) of the data were lost in transit to the central data storage location. Data loss in transit may result from communication errors, network shortages, write errors, etc. which impact a portion or all of the data sent from the edge node. These situations may thereby be identified and rectified before deleting the copy of the data retained at the edge node is deleted, thereby improving the efficiency by which new data is reflected in a central location in real-time.

A computer program product, according to another general approach, includes a computer readable storage medium having program instructions embodied therewith. The program instructions are readable by a processor, executable by the processor, or readable and executable by the processor, to cause the processor to: perform the foregoing method.

A system, according to yet another general approach, includes: a first edge node connected to a central data storage location, and a processor. The system also includes logic integrated with the processor, executable by the processor, or integrated with and executable by the processor. Moreover, the logic is configured to: perform the foregoing method.

A computer program product, according to another general approach, includes a computer readable storage medium having program instructions embodied therewith. The program instructions are readable by a processor, executable by the processor, or readable and executable by the processor, to cause the processor to: receive a first copy of data from a first edge node. By receiving data newly generated at edge nodes, implementations herein can implement changes to a distributed system in real-time. This desirably allows for a mirrored copy of the data that is received and/or produced at various edge nodes to be maintained at a central, easily accessible location.

The program instructions are also readable and/or executable by the processor to cause the processor to: store the first copy of data in a first storage location at the central data storage location. As noted above, implementations herein can implement changes to a distributed system in real-time. This desirably allows for a mirrored copy of the data that is received and/or produced at various edge nodes to be maintained. Implementations herein are thereby able to achieve an efficient and scalable data archive scheme across a distributed system in real-time. Accordingly, this scheme may be applied to various different types of implementations, e.g., such as enterprise edge node workloads. Approaches herein are also easily scalable, providing support to multiple edge nodes and multiple edge workloads, even in large enterprise settings.

The program instructions are also readable and/or executable by the processor to cause the processor to: receive second copy of data from a second edge node. Again, by receiving data newly generated at edge nodes, implementations herein can implement changes to a distributed system in real-time. This desirably allows for a mirrored copy of the data that is received and/or produced at various edge nodes to be maintained at a central, easily accessible location.

The program instructions are also readable and/or executable by the processor to cause the processor to: store the second copy of data in a second storage location at the central data storage location. Once again, implementations herein can implement changes to a distributed system in real-time. This desirably allows for a mirrored copy of the data that is received and/or produced at various edge nodes to be maintained. Implementations herein are thereby able to achieve an efficient and scalable data archive scheme across a distributed system in real-time.

The program instructions are also readable and/or executable by the processor to cause the processor to: receive a request from the first edge node to determine whether the first storage location includes a mirrored duplicate of the first copy of data received from the first edge node. Inspecting the copy stored at the central data storage location allows for the method to determine whether any portion(s) of the data were lost in transit to the central data storage location. Data loss in transit may result from communication errors, network shortages, write errors, etc. which impact a portion or all of the data sent from the edge node. These situations may thereby be identified and rectified before deleting the copy of the data retained at the edge node.

The program instructions are also readable and/or executable by the processor to cause the processor to: cause the first copy of data to be released from the first edge node by sending an acknowledgement to the first edge node in response to determining that the first storage location includes a mirrored duplicate of the first copy of data. Again, inspecting the copy stored at the central data storage location allows for the method to determine whether any portion(s) of the data were lost in transit to the central data storage location. Data loss in transit may result from communication errors, network shortages, write errors, etc. which impact a portion or all of the data sent from the edge node. These situations may thereby be identified and rectified before deleting the copy of the new data retained at the edge node. This desirably allows for a mirrored copy of the data that is received and/or produced at various edge nodes to be maintained in real-time. Implementations herein are thereby able to achieve an efficient and scalable data archive scheme across a distributed system. Maintaining a full copy of the data at a central and accessible location also significantly improves the efficiency at which the system as a whole is able to operate by providing quicker access to data.

In some implementations the program instructions are readable and/or executable by the processor to cause the processor to: issue a request to the first edge node for missing portions of the first copy of data in response to determining that the first storage location does not include a mirrored duplicate of the first copy of data. Again, inspecting the copy stored at the central data storage location allows for the method to determine whether any portion(s) of the data were lost in transit to the central data storage location. These situations may thereby be identified and rectified before deleting the copy of the data retained at the edge node. This desirably allows for a mirrored copy of the data that is received and/or produced at various edge nodes to be maintained in real-time.

Accordingly, the implementation further includes receiving the missing portions of the first copy of data, and using the missing portions to complete the mirrored duplicate of the first copy of data at the first storage location. Approaches herein are able to provide support to multiple edge nodes and multiple edge workloads, even in large enterprise settings. This reduces latency issues while also improving access to a greater amount of data, thereby improving the efficiency at which compute systems as a whole are able to operate.

In some implementations the program instructions are also readable and/or executable by the processor to cause the processor to: receive a request from the second edge node to determine whether the second storage location includes a mirrored duplicate of the second copy of data received from the second edge node. Once again, inspecting the copy stored at the central data storage location allows for the method to determine whether any portion(s) of the data were lost in transit to the central data storage location. These situations may thereby be identified and rectified before deleting the copy of the data retained at the edge node. This desirably allows for a mirrored copy of the data that is received and/or produced at various edge nodes to be maintained in real-time.

Accordingly, the implementation further includes causing the second copy of data to be released from the second edge node by sending an acknowledgement to the second edge node in response to determining that the second storage location includes a mirrored duplicate of the second copy of data. Approaches herein are able to provide support to multiple edge nodes and multiple edge workloads, even in large enterprise settings. This reduces latency issues while also improving access to a greater amount of data, thereby improving the efficiency at which compute systems as a whole are able to operate.

In some implementations the program instructions are also readable and/or executable by the processor to cause the processor to: issue a request to the second edge node for missing portions of the second copy of data in response to determining that the second storage location does not include a mirrored duplicate of the second copy of data. Again, inspecting the copy stored at the central data storage location allows for the method to determine whether any portion(s) of the data were lost in transit to the central data storage location. These situations may thereby be identified and rectified before deleting the copy of the data retained at the edge node. This desirably allows for a mirrored copy of the data that is received and/or produced at various edge nodes to be maintained in real-time.

Accordingly, the implementation further includes receiving the missing portions of the second copy of data, and using the missing portions to complete the mirrored duplicate of the second copy of data at the second storage location. Approaches herein are able to provide support to multiple edge nodes and multiple edge workloads, even in large enterprise settings. This reduces latency issues while also improving access to a greater amount of data, thereby improving the efficiency at which compute systems as a whole are able to operate.

A system, according to yet another general approach, includes: a central data storage location connected to a first edge node and a second edge node, and a processor. The logic is integrated with the processor, executable by the processor, or integrated with and executable by the processor, the logic being configured to: perform the foregoing operations.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product implementation ("CPP implementation" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved data archive code at block 150 for maintain a mirrored copy of data that is received and/or produced at various edge nodes, thereby achieving an efficient and scalable data archive scheme across a distributed system. In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices.

Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some implementations, storage 124 may take the form of a quantum computing storage device for storing data in the form of qubits. In implementations where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some implementations, network control functions and network forwarding functions of network module 115 are performed on the same physical hardware device. In other implementations (for example, implementations that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some implementations, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some implementations, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other implementations a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

In some respects, a system according to various implementations may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various implementations.

Figure 2:
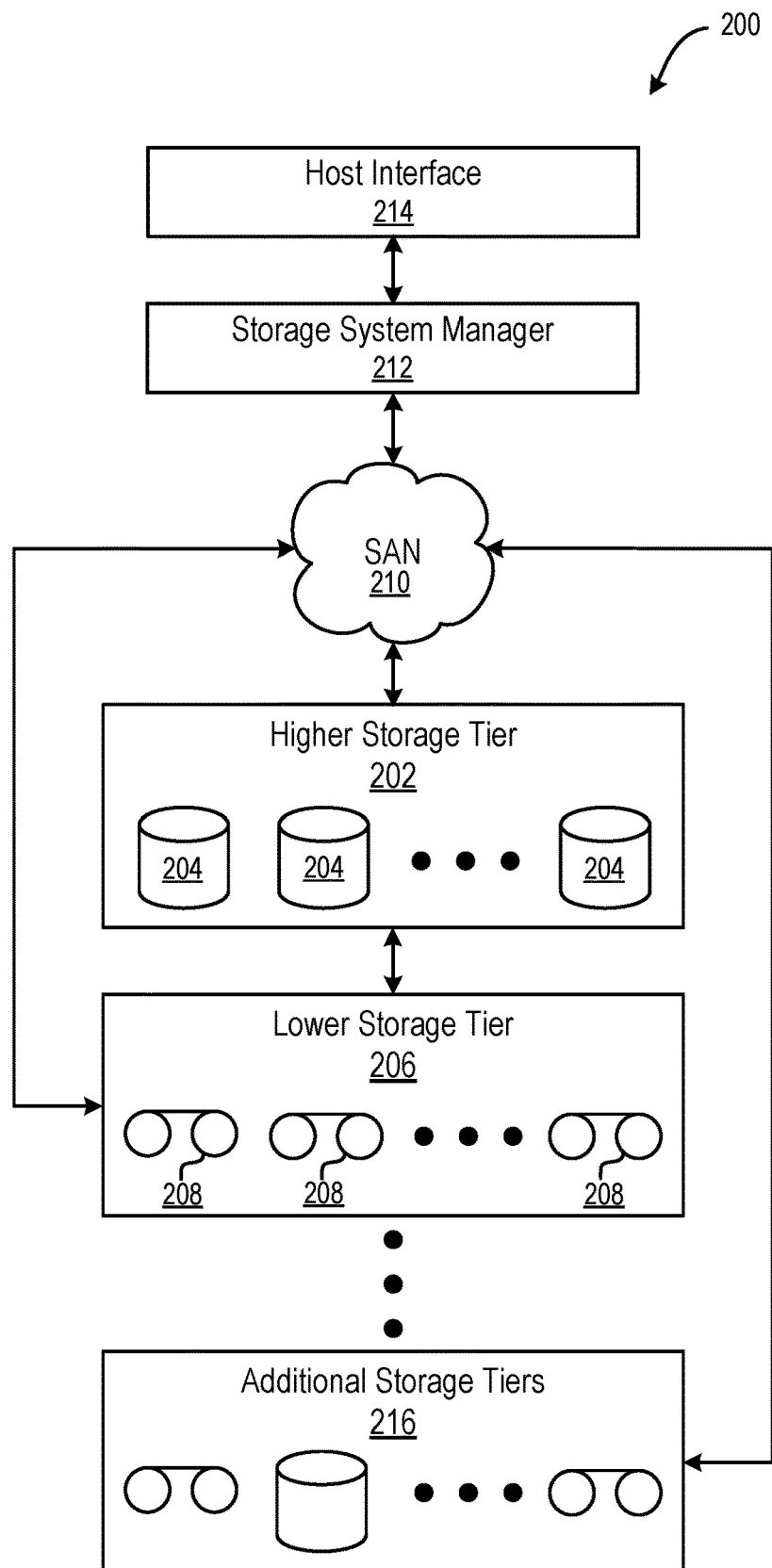
FIG. 2 is a diagram of a tiered data storage system, in accordance with one approach.

Now referring to FIG. 2, a storage system 200 is shown according to one approach. Note that some of the elements shown in FIG. 2 may be implemented as hardware and/or software, according to various approaches. The storage system 200 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 200. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a storage area network (SAN), as shown in FIG. 2, or some other suitable network type. The storage system manager 212 may also communicate with one or more host systems (not shown) through a host interface 214, which may or may not be a part of the storage system manager 212. The storage system manager 212 and/or any other component of the storage system 200 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more approaches, the storage system 200 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the approaches presented herein.

According to some implementations, the storage system (such as 200) may include logic configured to receive a request to open a data set, logic configured to determine if the requested data set is stored to a lower storage tier 206 of a tiered data storage system 200 in multiple associated portions, logic configured to move each associated portion of the requested data set to a higher storage tier 202 of the tiered data storage system 200, and logic configured to assemble the requested data set on the higher storage tier 202 of the tiered data storage system 200 from the associated portions.

It follows that storage system 200 is able to use different types of memory to implement different levels of performance. For instance, the storage system manager 212 is used to control where data is processed and/or stored in the system 200, where each location is capable of achieving a different performance level (e.g., outcome). Similarly, FIG. 3A below shows a distributed system 300 having different edge nodes 304, 306, 308 that are connected to a central data storage location 302. Accordingly, data and other information (e.g., commands, instructions, requests, metadata, etc.) can be sent between the edge nodes 304, 306, 308 and the central data storage location 302, e.g., as described in further detail below.

As noted above, data production has continued to increase as computing power and the use of IoT devices advance. For instance, the rise of smart enterprise endpoints has led to large amounts of data being generated at remote locations. Data production will only further increase with the growth of 5G networks and an increased number of connected mobile devices. This issue has also become more prevalent as the complexity of machine learning models increases. Increasingly complex machine learning models translate to more intense workloads and increased strain associated with applying the models to received data. The operation of conventional implementations has thereby been negatively impacted.

While cloud computing has been implemented in conventional systems in an effort to improve the ability to process this increasing amount of data, the unprecedented scale and complexity at which data is being created has outpaced network and infrastructure capabilities. Sending all device-generated data to a centralized data center or to a cloud location has resulted in bandwidth and latency issues in conventional systems.

In an attempt to combat this reliance on a network to perform all processing at a central location, edge computing has been implemented to extend computing to the endpoints in a system. For instance, applications are moved to the edge locations where the data is generated. Accordingly, both structured and unstructured data is generated at the edge locations where the workloads are executed.

While edge computing has improved how data is processed, conventional systems have suffered from inefficiencies caused by how the data produced at these edge locations is maintained. These inefficiencies have resulted in a number of operation-based and security-based errors. For instance, it is undesirable for data produced and processed at an edge to be stored there, as doing so involves consistent increment of storage at the edge, leading to increased processing overhead. This is especially true for edge workloads that involve object detection and/or image classification, which continually generate large amounts of unstructured data.

Each edge node also becomes a single point of failure for the entire system, thereby significantly degrading resiliency of such conventional systems. Should one of the edge nodes fail, not only are cached workloads at risk of permanent loss, but the data stored at the failed edge node is also at risk of permanent loss. Data generated at an edge is also often requested by downstream applications and reports. However, allowing downstream applications and reports to access the data directly from the edge nodes has introduced significant security risks in these conventional systems. These security risks include, but are not limited to, issues with access control, patching, chain of custody, transmission, encryption, integrity, export control, etc.

It follows that conventional systems have suffered from significant operational and performance based inefficiencies. In sharp contrast to these conventional shortcomings, implementations herein are able to ensure that data generated at the edge nodes remains available (e.g., for additional processing) in addition to being stored securely. Implementations herein are thereby able to overcome storage based and processing based issues that have plagued conventional systems.

These improvements are achieved in some implementations for systems that include (e.g., generate) unstructured data at the edge nodes of the systems. However, improvements may also be achieved in response to applying approaches described herein to systems that include structured data, combinations of structured and unstructured data, etc.

Figure 3A:
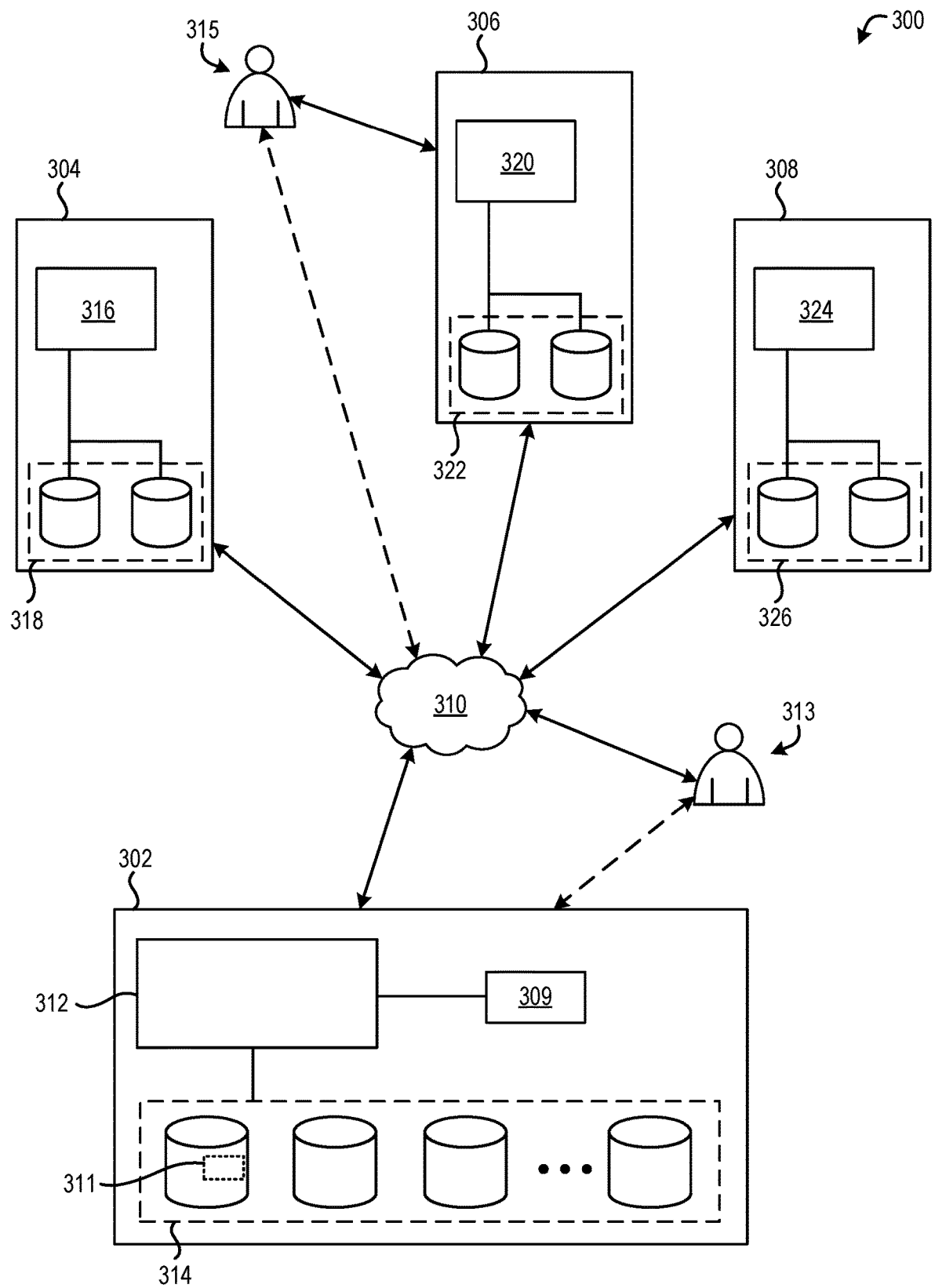
FIG. 3A is a representational view of a distributed system, in accordance with one approach.

Looking now to FIG. 3A, a system 300, having a distributed architecture in accordance with one approach. As an option, the present system 300 may be implemented in conjunction with features from any other approach listed herein, such as those described with reference to the other FIGS., such as FIGS. 1-2. However, such system 300 and others presented herein may be used in various applications and/or in permutations which may or may not be specifically described in the illustrative approaches or implementations listed herein. Further, the system 300 presented herein may be used in any desired environment. Thus FIG. 3A (and the other FIGS.) may be deemed to include any possible permutation.

As shown, the system 300 includes a central data storage location 302 that is connected to a first edge node 304, a second edge node 306, and a third edge node 308. Specifically, the central data storage location 302 and edge nodes 304, 306, 308 are connected to a network 310.

The network 310 may be of any type, e.g., depending on the desired approach. For instance, in some approaches the network 310 is a WAN, e.g., such as the Internet. However, an illustrative list of other network types which network 310 may implement includes, but is not limited to, a LAN, a PSTN, a SAN, an internal telephone network, etc. As a result, any desired information, data, commands, instructions, responses, requests, etc. may be sent between the edge nodes 304, 306, 308 and/or central data storage location 302, regardless of the amount of separation which exists therebetween, e.g., despite being positioned at different geographical locations.

It should also be noted that two or more of the edge nodes 304, 306, 308 and/or central data storage location 302 may be connected differently depending on the approach. According to an example, two edge compute nodes may be located relatively close to each other and connected by a wired connection, e.g., a cable, a fiber-optic link, a wire, etc.; etc., or any other type of connection which would be apparent to one skilled in the art after reading the present description.

With continued reference to FIG. 3A, the edge nodes 304, 306, 308 may have a different configuration than the central data storage location 302. For example, in some implementations the central data storage location 302 includes a large (e.g., robust) processor 312 coupled to a cache 309 and a data storage array 314 having a relatively high storage capacity. The central data storage location 302 is thereby able to process and store a relatively large amount of data, allowing it to be connected to, and manage, multiple different remote edge nodes (also referred to herein as "edge locations"). As noted above, the central data storage location 302 may receive data, commands, etc. from any number of locations. The components included in the central data storage location 302 thereby preferably have a higher storage capacity and throughput than components included in each of the edge nodes 304, 306, 308 to accommodate the higher flow of data experienced at the central data storage location 302.

It should be noted that with respect to the present description, "data" may include any desired type of information. For instance, in different implementations data can include raw sensor data, metadata, program commands, instructions, etc. Moreover, while implementations herein are described in the context of unstructured data, this is in no way intended to be limiting. Any desired type of data may be applied to the approaches herein. It follows that the processor 312 may use the cache 309 and/or storage array 314 to actually cause one or more data operations to be performed. According to an example, the processor 312 at the central data storage location 302 may be used to perform one or more operations of method 400 of FIG. 4.

An administrator 313 of the central data storage location 302 and/or processor 312 itself is also shown as being connected to network 310 in FIG. 3A. In some implementations, the administrator 313 may be directly connected to the central data storage location 302 as represented by the dashed arrowed line. It follows that the administrator 313 may be able to control at least a portion of the central data storage location 302, e.g., such as the filesystem 311 in data storage array 314.

Figure 3B:
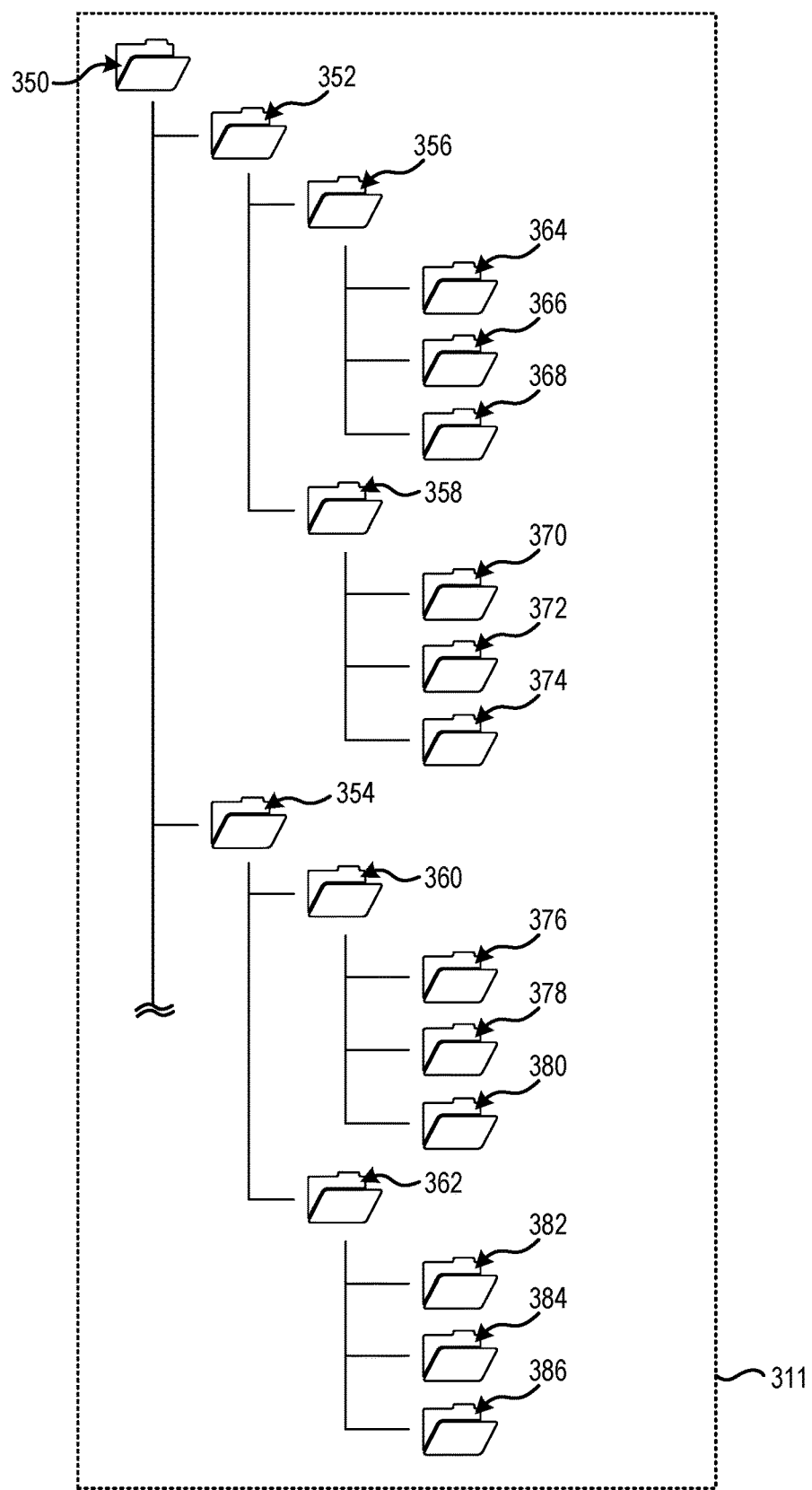
FIG. 3B is a partial representational view of a logical filesystem in the distributed system of FIG. 3A.

Referring momentarily to FIG. 3B, a representational view of a filesystem 311 is shown in accordance with one approach. As an option, the present filesystem 311 may be implemented in conjunction with features from any other implementation listed herein, such as those described with reference to the other FIGS., such as FIG. 3A. For instance, filesystem 311 is shown as corresponding to a particular portion of physical storage in the data storage array 314, e.g., as would be appreciated by one skilled in the art after reading the present description. However, such filesystem 311 and others presented herein may be used in various applications and/or in permutations which may or may not be specifically described in the illustrative implementations listed herein. Further, the filesystem 311 presented herein may be used in any desired environment. Thus FIG. 3B (and the other FIGS.) may be deemed to include any possible permutation.

As shown, the filesystem 311 includes a main folder 350 which may serve as a root folder. The main folder 350 includes sub-folders 352, 354, each of which may correspond to a respective edge node. It follows that the main folder 350 may include any desired number of sub-folders depending on the number of edge nodes that are connected to a central data storage location in a distributed system. It follows that while only two sub-folders 352, 354 are included in FIG. 3B, additional sub-folders corresponding to additional edge nodes may also be included under the main folder 350.

Each of the sub-folders 352, 354 also include layers that are directed to the different workloads that are being performed at the respective edge nodes. Accordingly, sub-folder 352 includes layer 356 which corresponds to a first workload being performed at the respective edge node. Sub-folder 352 also includes layer 358 which corresponds to a second workload being performed at the respective edge node.

Each of the layers 356, 358 further include a number of directory locations, each of which correspond to a different type of data. As noted above, data included at an edge node may have been received from a number of different sources. For example, different types of sensors produce different types of data, and this data may be used to form different types of files. For example, data received from a video camera may be used to produce video files (e.g., such as .avi files, .wmv files, .gif files, etc.), while data received from a microphone may be used to produce audio files (e.g., such as .mp3 files, .m4p files, .wav files, etc.), and data received from a digital still camera may be used to produce image files (e.g., such as .jpg files, .tif files, .png files, etc.).

Accordingly, each of the directory locations 364, 366, 368 under layer 356 store a different type of data therein.

Similarly, directory locations 370, 372, 374 store a different type of data under layer 356. According to an example, which is in no way intended to limit the invention, directory locations 364, 370 are each configured (e.g., designated) to store video files under the respective layer, directory locations 366, 372 are each configured to store audio files for the respective layer, and directory locations 368, 374 are each configured to store metadata for the respective layer of the edge node.

Sub-folder 354 includes layers 360 and 362, each of which correspond to a workload being performed at the respective edge node. The layers 360, 362 further include a number of directory locations, each of which corresponds to a different type of data. Accordingly, each of the directory locations 376, 378, 380 under layer 360 store a different type of data, while directory locations 382, 384, 386 store a different type of data under layer 362. It should also be noted that directory locations 364, 366, 368, 370, 372, 374, 376, 378, 380, 382, 384, 386 are also referred to as "child folders" in some of the approaches herein.

The configuration of the filesystem 311 as described in the approaches herein allows for detailed copies of data to be stored. As noted above, the main folder 350 includes sub-folders 352, 354, each of which may correspond to a respective edge node. Accordingly, each sub-folder of the filesystem 311 may be used to maintain a mirrored copy of data that is received and/or produced at a number of edge nodes, e.g., as will be described in further detail below.

Referring back to FIG. 3A, a user 315 is also illustrated as being connected to one of the edge nodes 306. In some approaches, the user 315 connects to the edge node 306 through a compute device (e.g., such as the user's personal computer, mobile phone, on-premise server, etc.) such that information can be exchanged therebetween. However, in other approaches the user 315 may be able to access the edge node 306 using one or more terminals having a user interface. The user 315 may also be connected to the network 310 in some implementations. Accordingly, the user 315 may access edge node 306 and/or other locations in system 300 through the network 310 in such implementations. In still other implementations, the user may be able to access network 310 through a direct connection to the edge node 306.

The first edge node 304 includes a processor 316 coupled to data storage 318. Similarly, edge node 306 includes a processor 320 coupled to data storage 322, and edge node 308 includes a processor 324 coupled to data storage 326. The data storage implemented at each of the edge nodes 304, 306, 308 may be used to store data received from one or more sensors (not shown) in communication with the respective edge nodes, a user 315 in communication with one or more of the edge nodes, other ones of the edge nodes, different systems also connected to network 310, etc.

The system 300 also preferably includes an archive handler that is configured to manage file hierarchy at the edge nodes 304, 306, 308 and/or a mirrored file hierarchy at the central data storage location 302. In some approaches, the archive handler includes a software application program designed to manage archives (e.g., file hierarchies or filesystems) at one of the edge nodes 304, 306, 308 and/or central data storage location 302. The archive handler may be a distributed microservice (e.g., a style of application architecture in which a collection of independent services communicate through lightweight application program interfaces) that is deployed in each edge node in some implementations. The archive handler may thereby be able to select, collect, store, protect, etc., data from various locations for long-term storage. To achieve this functionality, the archive handler may include a set of observer components and/or a remover component implemented as distributed microservice code at various locations, e.g., as will be described in further detail below.

The data storage 318, 322, 326 at each of the respective edge nodes 304, 306, 308 may implement a respective filesystem, each of which may share certain aspects with filesystem 311 as seen in FIG. 3B. For example, each data storage 318, 322, 326 may include sub-folders, layers, and directory locations (e.g., child folders) as seen in FIG. 3B. Data storage 318, 322, 326 of FIG. 3A may further include an observer component for each of the directory locations that are included at each of the edge nodes 304, 306, 308. It follows that new observer components are created in response to identifying new child folders that are introduced to the filesystems of the respective edge nodes 304, 306, 308.

Each of the edge nodes 304, 306, 308 may also include a remover component. A remover component may be used to determine whether a temporary copy of data stored at one of the edge nodes 304, 306, 308 has been stored for a predetermined amount of time. In some situations, it is desirable that certain data remain available at the edge node that received and/or produced the data. However, data is eventually removed from the edge nodes to ensure storage capacity is freed over time to accommodate newly received and/or generated data. The remover component may thereby monitor copies of data that remain stored at the edge nodes for at least a predetermined amount of time, e.g., as will be described in further detail below in method 400 of FIG. 4.

While the edge nodes 304, 306, 308 are depicted as including similar components and/or design, it should be noted that each of the edge nodes 304, 306, 308 may include any desired components which may be implemented in any desired configuration. In some instances, each edge node in a system may be configured differently to provide each location with a different functionality. According to an example, which is in no way intended to limit the invention, edge node 304 may include a cryptographic module (not shown) that allows the edge node 304 to produce encrypted data, while edge node 306 includes a data compression module (not shown) that allows the edge node 306 to produce compressed data.

It follows that the different edge nodes (e.g., servers) in system 300 may have different performance capabilities. As noted above, the central data storage location 302 may have a higher storage capacity compared to the edge nodes 304, 306. While this may allow the central data storage location 302 the ability to store more data than the edge nodes 304, 306, 308, other factors impact performance. For example, traffic over network 310 may limit the amount of data that may be sent from the edge nodes 304, 306, 308 to the central data storage location 302. The workload experienced at a given time also impacts latency and limits the achievable performance of the system 300.

While these varying performance characteristics have had a material impact on the efficiency by which conventional systems are able to operate, implementations herein are desirably able to orchestrate the availability of data such that the system operates more efficiently while also improving data retention. For example, differing types of data may be used at different locations across a system. As noted above, data may be generated and processed at an edge node, in addition to being requested by downstream applications at a central data storage location. Approaches herein are thereby able to ensure data is available at certain locations, while improving operational efficiency of the system and data security, by keeping a backup copy of the data at the edge node for at least some time.

Some of the implementations herein may even be able to adjust performance by monitoring and reacting to changes in bandwidth limitations, high-quality real-time media streaming, excess latency, network congestion, etc. Implementations may thereby be able to dynamically update settings of the system to maintain a relatively high level of efficiency.

Figure 4:
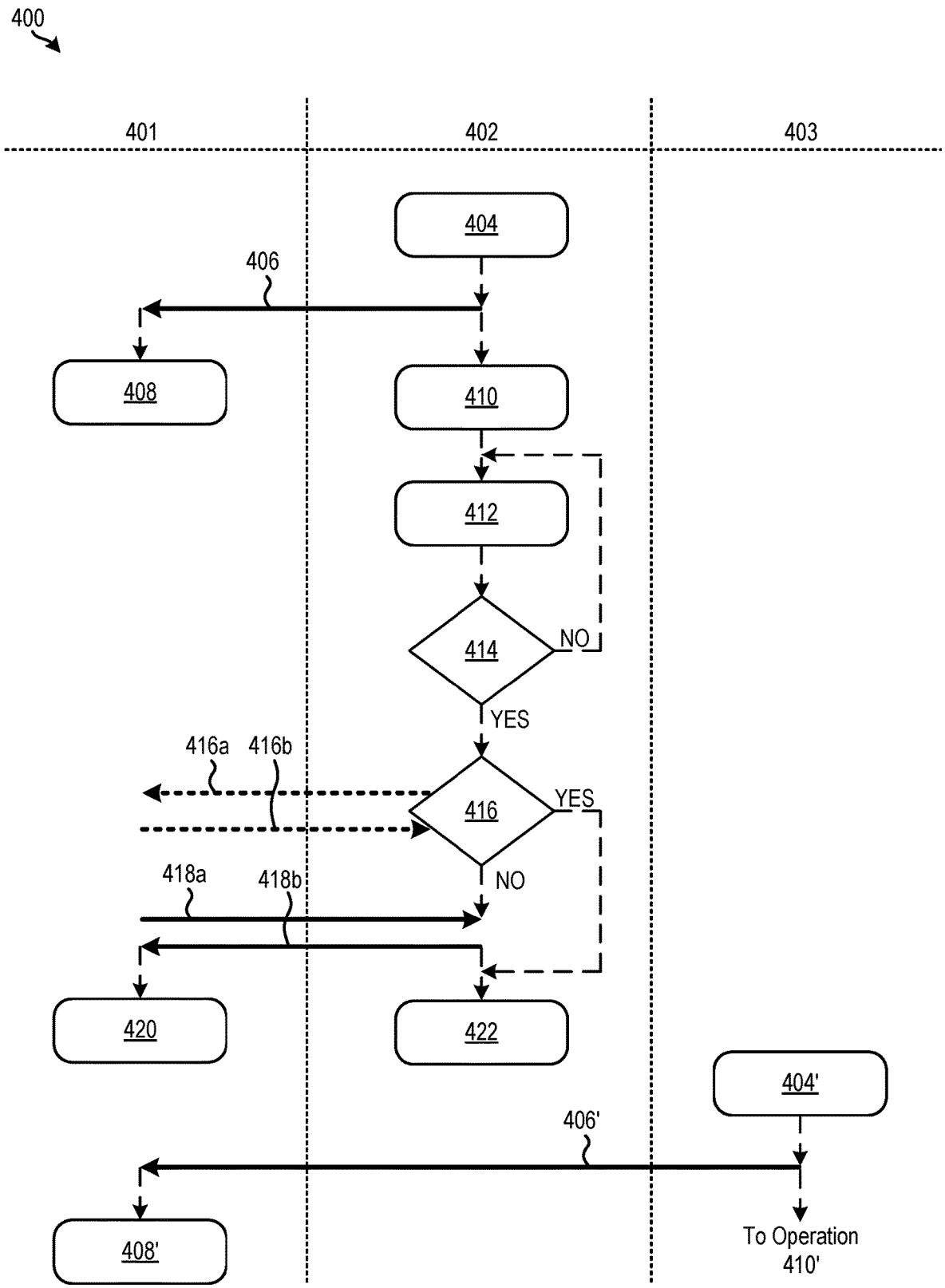
FIG. 4 is a flowchart of a method, in accordance with one approach.
Figure 4:
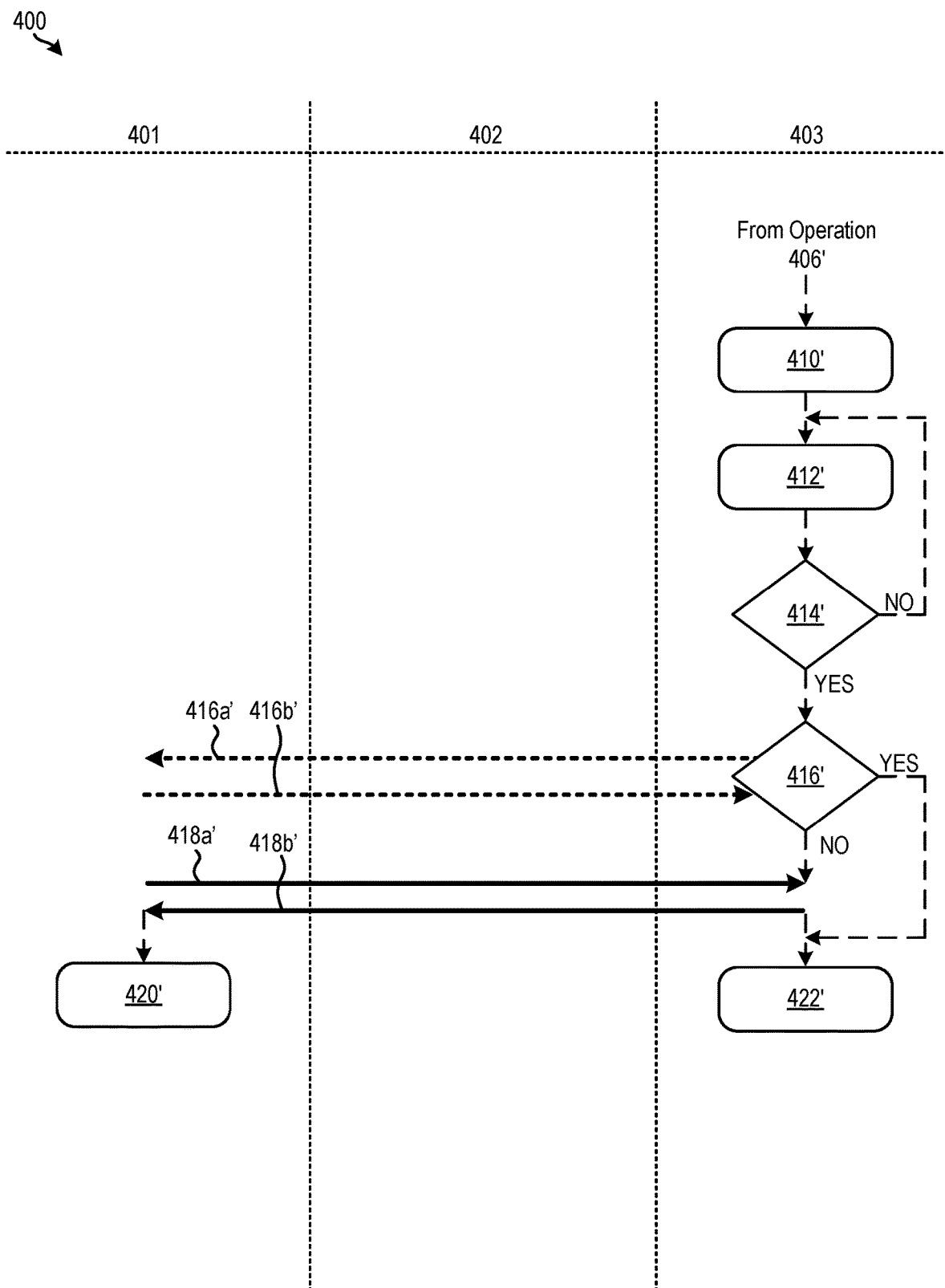

Looking now to FIG. 4, a method 400 for implementing an autonomous data archive procedure across a distributed system is illustrated in accordance with one approach. Accordingly, the operations of method 400 may be performed continually in the background of an operating system without requesting input from a user (e.g., human). While certain information (e.g., warnings, reports, read requests, etc.) may be issued to a user, it is again noted that the various operations of method 400 can be repeated in an iterative fashion for each instance of new data detected at any of the edge nodes connected to a central data storage location. Thus, method 400 may be performed in accordance with the present invention in any of the environments depicted in FIGS. 1-3, among others, in various approaches. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, each of the nodes 401, 402, 403 shown in the flowchart of method 400 may correspond to one or more processors positioned at a different location in a multi-tiered data storage system. Moreover, each of the one or more processors are preferably configured to communicate with each other.

In another example, at least one of the nodes 401, 402, 403 may include an archive handler configured to manage file hierarchy at edge nodes and/or a mirrored file hierarchy at a centralized data vault. In some approaches, the archive handler includes a software application program designed to manage archives (e.g., file hierarchies or filesystems). The archive handler may thereby be able to select, collect, store, protect, etc., data for long-term storage. To achieve this functionality, the archive handler may include a set of observer components and/or a remover component, e.g., as will be described in further detail below.

In various implementations, the method 400 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 4 includes different nodes 401, 402, 403, each of which represent one or more processors, controllers, computer, etc., positioned at a different location in a distributed data storage system. For instance, node 401 may include one or more processors located at a central data storage location (e.g., main server) of a distributed compute system (e.g., see central data storage location 302 of FIG. 3A above). Node 402 may include one or more processors located at a first edge node (e.g., edge server) of a distributed compute system (e.g., see edge node 304 of FIG. 3A above). Furthermore, node 403 may include one or more processors located at a second edge node of a distributed compute system (e.g., see edge node 306 of FIG. 3A above). Accordingly, commands, data, requests, etc. may be sent between each of the nodes 401, 402, 403 depending on the approach.

Moreover, it should be noted that the various processes included in method 400 are in no way intended to be limiting, e.g., as would be appreciated by one skilled in the art after reading the present description. For instance, data sent from node 402 to node 403 may be prefaced by a request sent from node 403 to node 402 in some approaches. Additionally, the number of nodes included in FIG. 4 is in no way intended to be limiting. For instance, a third edge node may be included in some approaches (e.g., see edge node 308 of FIG. 3A above). Accordingly, any desired number of edge nodes may be connected to the central data storage location, e.g., as would be appreciated by one skilled in the art after reading the present description.

It should also be noted that each of the nodes 402, 403 (e.g., edge nodes) preferably include a remover component and a plurality of observer components. With respect to the present description, a "component" is intended to refer to a function or portion of software that includes processes which produce an intended outcome. Thus, the remover component may be a function that operates in the background of the respective edge node, e.g., at a predetermined interval. Similarly, each of the observer components may be a function that operates in the background of the respective edge node, e.g., continually in an iterative fashion.

Looking to FIG. 4, method 400 includes operation 404 which is performed at node 402. There, operation 404 includes detecting new data generated at node 402. As noted above, node 402 may correspond to an edge node of a distributed system. Node 402 may thereby receive data from one or more locations (e.g., sensors) over time. The data received at an edge node may also be processed (e.g., evaluated) there to distribute data processing overhead to the edge nodes, thereby allowing for throughput of the system as a whole to improve. Accordingly, node 402 may also generate data over time as information is processed.

According to an example, which is in no way intended to limit the invention, node 402 may include a number of observer components. As noted above, each observer component may correspond to a different folder (e.g., child folder) of a filesystem in data storage at an edge node. Thus, any data added to one of the folders in the filesystem at the edge node may be identified by the corresponding observer component assigned to the folder. Operation 404 may thereby detect the new data generated at a child folder at node 402 in response to receiving a notification from a respective one of the observer components.

From operation 404, method 400 proceeds to operation 406 which includes causing a first copy of the new data to be transferred to a central data storage location at node 401. The first copy of the new data is preferably sent to the central data storage location in real-time. This desirably allows a mirrored copy of data received and/or generated at each of the edge nodes connected to the central data storage location to be maintained at the central data storage location. Accordingly, any errors experienced at the edge nodes (e.g., such as data loss, system failure, loss of power, etc.) will not compromise functionality of the overarching system. The central copy of the data can be used to dynamically adjust how each of the edge nodes are operating, thereby overcoming any such errors at the edge nodes.

In one example, the process of causing a first copy of the new data to be transferred to a central data storage location includes storing the first copy in a "DataOut" directory configured to automatically transfer any data stored therein to the central data storage location. Accordingly, storing the first copy of the new data in a "DataOut" directory at node 402, automatically results in the first copy being sent to node 401. Again, see operation 406. It follows that in some implementations, operation 406 may also include removing (e.g., deleting) the first copy of the new data from the "DataOut" directory in response to node 401 receiving a copy.

In response to receiving the first copy of the new data from node 402, node 401 performs operation 408. There, operation 408 includes storing the first copy of data in a first data storage location at the central data storage location. As noted above, the type and/or source of data may impact where or how the data is stored at the central data storage system. For instance, the type of data received in operation 406 may determine the filesystem directory folder that the data is stored in at the central data storage location. Accordingly, operation 408 may include inspecting data details to determine a proper storage location.

Returning to node 402, operation 410 is performed in response to the first copy of the new data being transferred to the central data storage location at node 401. There, operation 410 includes causing a second copy of the new data to be stored at node 402. Because operations 408 and 410 are performed by different components at different nodes, at least a portion of the operations 408, 410 may be performed in parallel. Accordingly, the first copy of the new data may be stored in a central data storage location at least partially in parallel with a second copy of the new data being stored at a source edge node. In one example, the second copy of the new data is stored in a "DataHolding" directory that is configured to store the second copy of the new data for a predetermined amount of time, e.g., as will soon become apparent.

Proceeding to operation 412, method 400 includes waiting a predetermined amount of time before proceeding to operation 414. In other words, operation 412 includes a predetermined timeout which allows for copies of data stored at node 402 to remain in data storage before being removed from node 402. As noted above, data received and/or generated at an edge node may be used for additional processing in some situations. The data may also be needed to correct one or more errors that are experienced. For example, the copy of data sent from node 402 in operation 406 may not be fully received at node 401 as a result of transmission errors, data write errors, etc. Accordingly, by maintaining a copy of the new data sent in operation 406 at node 402 for at least a predetermined amount of time, method 400 is able to respond to a number of data management situations in real-time without having to request a copy of the new data be returned from the central data storage location. This allows for implementations herein to improve performance of the system by significantly reducing latency experienced by conventional systems.

The amount of time certain data is kept in storage at an edge node differs depending on certain factors. For instance, the amount of time a copy of data (e.g., a copy of a file) is maintained at an edge node following sending another copy of the data to a central data storage location is predetermined based at least in part on a type of information included in the copies of the data. Certain types of data may be more difficult to process, and therefore copies of such data may be maintained longer in storage than other types of data.

Moreover, some data types may be processed using more secure procedures in comparison to other data types, thereby resulting in the different types of data being kept in storage at the edge nodes different amounts of time.

In other implementations, the amount of time a copy of data is maintained at an edge node is predetermined based at least in part on the amount of information included in the copies of data. In other words, the size of the data copies may impact an amount of time a copy is maintained in storage at an edge node. These relationships may be predefined by a user, based on dynamic system conditions (e.g., such as an amount of data stored at the edge node, current workloads, user input, etc.), etc. In other approaches, a copy of data may be held in an edge node for a predetermined number of data operations, for a predetermined number of data errors experienced, based on an output from a machine learning model, etc.

It follows that an adaptive function may be used to determine the amount of time that a given copy of data is stored at the edge node. This function may be adaptively applied to different data (e.g., files) based on operational parameters, which may include the type and/or amount of data being held at the edge node. In some implementations, a discrete function with a set of variables corresponding to characteristics of the data file (e.g., file type, file size, etc.) in question may be implemented. Depending on the approach, the function may be implemented as conditional statements, organized as values in a lookup table, etc.

In other approaches, the amount of time that a given copy of data is stored at the edge node is determined as a result of implementing one or more machine learning models. These machine learning models may be trained to generate the desired amount of time that a backup copy of data sent to a central remote vault, is kept at the edge node. For instance, a machine learning model (e.g., a neural network) may be trained using labeled and/or unlabeled data corresponding to past performance of a distributed system implementing any of the processes described herein. Over time, the machine learning model may thereby be able to identify when the backup copies of data sent to the central data vault are referenced. This understanding will allow the machine learning model to determine an ideal amount of time to keep each copy of data in storage at the respective edge nodes. The machine learning model achieves this by balancing the impact each copy has on data storage capacity at the edge node with the amount of data errors that are experienced at the central data vault and/or additional processing that is performed on data stored at the edge nodes, e.g., as would be appreciated by one skilled in the art after reading the present description.

In still other implementations, the amount of time a copy of data is held at an edge node is specified by a user. However, if a user entry is not received, a predetermined value may be implemented as a default. Operation 414 thereby determines whether the second copy of the new data should be removed from the edge node at node 402. While operation 412 includes waiting a predetermined amount of time as described above, certain copies of data may remain in storage at an edge node. For example, it may be determined that a corresponding copy of data has not yet been successfully stored at the central data storage location, e.g., as a result of network traffic, compute congestion at the central data storage location, etc. Accordingly, method 400 returns to operation 412 in response to determining that the second copy of the new data should not be removed from the edge node at node 402.

Method 400 proceeds from operation 414 to operation 416 in response to determining that the second copy of the new data should be removed from the edge node at node 402. There, operation 416 includes determining whether any information in the first copy of the new data transferred to node 401 is missing. In other words, operation 416 includes determining whether any data is missing at the central data storage location. In some approaches, operation 416 includes sending one or more queries to the central data storage location. For example, the determination is made by verifying whether any files are missing from the central data storage location. Moreover, this verification may be made using information gathered by a remover component, e.g., as an initial portion of performing a removal procedure in a respective DataHolding directory.

It follows that in some implementations, operation 416 includes sending a request to node 401 to determine whether the central data storage location includes a mirrored duplicate of the first copy of data sent in operation 406 above. For example, see dashed line 416a. In response to receiving the request from the edge node to determine whether a mirrored duplicate of the data received from the edge node was successfully stored, the central data storage location may inspect one or more directory locations in storage to determine whether a complete copy of the new data originally sent from an edge node is secure.

In other words, the central data storage location is tasked with identifying whether a full copy of the new data is retained in storage there. In some instances, some data may be lost in transit as a result of encrypting and/or decrypting errors, write errors, connection issues, etc. Thus, while a full copy of data may be successfully sent from an edge node, it may not be stored successfully in storage at the central data storage location in every situation. Evaluating the data that has successfully been stored at the central data storage location thereby ensures that a mirrored (e.g., fully intact) copy of the new data sent from an edge node has been successfully written in storage. A result of determining whether a full copy of the data is written in storage at node 401 is thereafter returned to the edge node at node 402, as represented by dashed line 416b.

In situations where it is determined at operation 416 that at least a portion of the data originally sent from one of the edge nodes has not been successfully transferred to the central data storage location, method 400 proceeds to operation 418a. In other words, method 400 advances to operation 418a in response to determining that the data stored at the central data storage location is at least partially incomplete. There, operation 418a includes issuing a request to the first edge node for the missing portions of the data. However, in some implementations, the information returned along dashed line 416b above may also include a request for the portions of data identified as being absent from the central data storage location.

In response to receiving a request for missing portions of data, node 402 preferably accesses the copy of the new data originally sent (the second copy of the new data) that is still stored at node 402. As noted above, a second copy of data sent from an edge node to a central data storage location is preferably stored for a period of time at the edge node. This backup copy of the data may thereby be used in situations where it is determined that the central data storage location is missing portions of the data.

In other words, maintaining the second copy of the new data at the edge node helps ensure the central data storage location includes a full copy of data received and/or processed by a system (e.g., see system 300 of FIG. 3), prior to removing the second copy of data from a temporary directory location.

Operation 418b thereby includes returning the missing portions of data that were requested, to node 401. In response to receiving the missing portions of data, node 401 further includes using the missing portions to complete the mirrored duplicate of data. See operation 420. For instance, portions of the data at the central data storage location may be rewritten to produce a complete copy of the new data intended to be originally sent in operation 406.

As noted above, a central data storage location preferably stores a mirrored and real-time copy of the data that is received and/or generated at various edge nodes. This allows the overarching system to significantly improve data retention by maintaining a complete and up-to-date copy of the data at a central location. Maintaining a full copy of the data at a central and accessible location also significantly improves the efficiency at which the system as a whole is able to operate. As noted above, data produced at an edge node may be requested downstream at different locations of a distributed system, e.g., to perform additional processing. Accordingly, by sending copies of data to the central data storage location from the edge nodes in real-time as the data is received and/or generated, the central data storage location is able to satisfy operations and requests that pertain to data from one or more edge nodes.

With continued reference to FIG. 4, method 400 proceeds from operation 418b to operation 422 in response to sending the missing portions of the data to node 401. However, in some approaches, edge node 402 may send a verification request to node 401 in order to verify that the copy of the new data at the central data storage location is now a complete, mirrored copy of the data received and/or generated at the corresponding edge node. The verification request may effectively serve as a release verification for the edge node at node 402. Accordingly, operation 422 includes removing the copy of the new data still stored in the edge node of node 402 in response to successfully transferring the missing information to the central data storage location node 402.

In some approaches, causing a copy of the new data to be removed from storage at an edge node includes sending one or more instructions to a remover component included at the edge node. As noted above, a remover component may be a function that operates in the background of the respective edge node, e.g., at predetermined intervals, randomly, in response to an input received from a user, etc. The one or more instructions are preferably configured to cause the remover component to remove a referenced copy of data from a corresponding storage location.

Depending on the approach, a copy of data may be removed from an edge node by deleting the data from storage, invalidating the data stored in a particular portion of storage, marking a portion of storage storing the copy of data for garbage collection, etc. It follows that the steps taken to remove a copy of the data from an edge node may depend on the type of data included in the edge node.

Upon determining that the central data storage location includes a complete copy of data, the temporary copy of the new data stored at the edge node that received the data from a sensor and/or generated the data by processing additional information, may be removed in order to accommodate additional copies of data. Method 400 is thereby able to ensure data security and efficient performance of a corresponding system as a whole. As noted above, maintaining an updated and accurate copy of data at a centralized and accessible location allows for data access times to be reduced, thereby allowing processes to be performed more efficiently, and the system as a whole operating more efficiently.

This, combined with maintaining a copy of data at the source location for at least some time, further improves performance. Again, this temporary copy of the new data serves as a backup in the event that any data is lost while being transferred to the central data storage location, e.g., as a result of encryption and/or decryption errors, network errors, write errors, etc. Maintaining the temporary copy of data thereby increases data security. Additionally, the temporary copy keeps the corresponding data available at the edge location for a period of time. In some situations, supplemental applications, programs, etc. which reference (e.g., use) the data in the temporary copy are performed at the edge node, even after a copy of the new data has been sent to the central data storage location. Maintaining the backup copy of the new data at the edge node for a period of time thereby reduces data access times and improves efficiency of the supplemental applications, programs, etc.

Returning to operation 416, in some situations it is determined that the first storage location does include an updated (real-time) and mirrored (accurate) duplicate of the data originally sent in operation 406. In such situations, a release acknowledgement may be sent to the first edge node, causing the additional copy of the new data maintained at node 402 to be released. Accordingly, method 400 proceeds directly from operation 416 to operation 422 in such situations.

It follows that method 400 is able to maintain a mirrored copy of the data that is received and/or produced at various edge nodes, thereby achieving an efficient and scalable data archive scheme. Accordingly, this scheme may be applied to various different types of implementations, e.g., such as enterprise edge node workloads. Approaches herein are also easily scalable, providing support to multiple edge nodes and multiple edge workloads, even in large enterprise settings.

Performance of the system is also improved by implementing an archive handler that can be easily deployed as a containerized edge workload to various edge nodes. This helps make data available for downstream consumption in real-time, while also protecting the edge node from unnecessary access. Data is kept available at the edge nodes as long as is desired, e.g., as determined in a number of different ways as described herein. This further minimizes the cost of storage at each of the edge nodes.

Again, approaches herein have significantly improved data retention by maintaining a complete and up-to-date copy of data from a number of edge nodes, at a central location. Maintaining a full copy of the data at a central and accessible location also significantly improves the efficiency at which the system as a whole is able to operate by providing quicker access to data. As noted above, data produced at an edge node may be requested downstream at different locations of a distributed system, e.g., to perform additional processing. Accordingly, by sending copies of data to the central data storage location from the edge nodes in real-time as the data is received and/or generated, the central data storage location is able to satisfy operations and requests that pertain to data from one or more edge nodes.

With continued reference to FIG. 4, it should be noted that node 403 may include any one or more of the operations described above with respect to node 402. Accordingly, node 403 is shown as implementing a variation of the operations performed in node 402. Various operations performed at node 403 thereby have common numbering with those performed at node 402. It follows that any of the operations performed at node 403 may implement any aspects of the various implementations included herein. In other words, the operations performed at node 403 may be the same as or similar to those presented at node 402, e.g., as would be appreciated by one skilled in the art after reading the present description.

Specifically, node 403 is shown as detecting new data generated at node 403. See operation 404'. From operation 404', method 400 proceeds to operation 406', which includes causing a first copy of the new data to be transferred to node 401. In response to receiving the first copy of the new data from node 403, node 401 performs operation 408'. There, operation 408 includes storing the first copy of data in a second storage location at the central data storage location. As noted above, the type and/or source of data may impact where or how the data is stored at the central data storage system. For instance, the type of data received in operation 406' may determine the filesystem directory folder that the data is stored in at the central data storage location. Accordingly, operation 408' may include inspecting data details to determine a proper storage location.

Returning to node 403, operation 410' is performed in response to the first copy of the new data being transferred to the central data storage location at node 401. There, operation 410' includes causing a second copy of the new data to be stored at node 403. Because operations 408' and 410' are performed by different components at different nodes, at least a portion of the operations 408', 410' may be performed in parallel. Accordingly, the first copy of the new data may be stored in a central data storage location at least partially in parallel with a second copy of the new data being stored at a source edge node. In one example, the second copy of the new data is stored in a "DataHolding" directory that is configured to store the second copy of the new data for a predetermined amount of time, e.g., as will soon become apparent.

Proceeding to operation 412', method 400 includes waiting a predetermined amount of time before proceeding to operation 414'. Operation 414' includes determining whether the second copy of the new data should be removed from the edge node at node 403. Accordingly, method 400 returns to operation 412' in response to determining that the second copy of the new data should not be removed from the edge node at node 403.

Method 400 proceeds from operation 414' to operation 416' in response to determining that the second copy of the new data should be removed from the edge node at node 402. There, operation 416' includes determining whether any information in the first copy of the new data transferred to node 401 is missing. In some situations, it is determined that node 401 currently includes an updated (real-time) and mirrored (accurate) duplicate of the data originally sent in operation 406'. In such situations, a release acknowledgement may be sent to the first edge node, causing the additional copy of the new data maintained at node 403 to be released. Accordingly, method 400 proceeds directly from operation 416' to operation 422' in such situations.

However, in situations where it is determined at operation 416' that at least a portion of the data originally sent from one of the edge nodes has not been successfully transferred to the central data storage location, method 400 proceeds to operation 418a'. There, operation 418a' includes issuing a request to the first edge node for the missing portions of the data.

In response to receiving a request for missing portions of data, node 403 preferably accesses the copy of the new data originally sent (the second copy of the new data) that is still stored at node 403. As noted above, a second copy of data sent from an edge node to a central data storage location is preferably stored for a period of time at the edge node. This backup copy of the new data may thereby be used in situations where it is determined that the central data storage location is missing portions of the data.

In other words, maintaining the second copy of the new data at the edge node helps ensure the central data storage location includes a full copy of data received and/or processed by a system (e.g., see system 300 of FIG. 3), prior to removing the second copy of data from a temporary directory location.

Operation 418b' thereby includes returning the missing portions of data that were requested to node 401. In response to receiving the missing portions of data, node 401 further includes using the missing portions to complete the mirrored duplicate of data. See operation 420'. Method 400 proceeds from operation 418b' to operation 422' in response to sending the missing portions of the data to node 401. There, operation 422' includes removing the copy of the new data still stored in the edge node of node 402 in response to successfully transferring the missing information to the central data storage location node 402.

Figure 5:
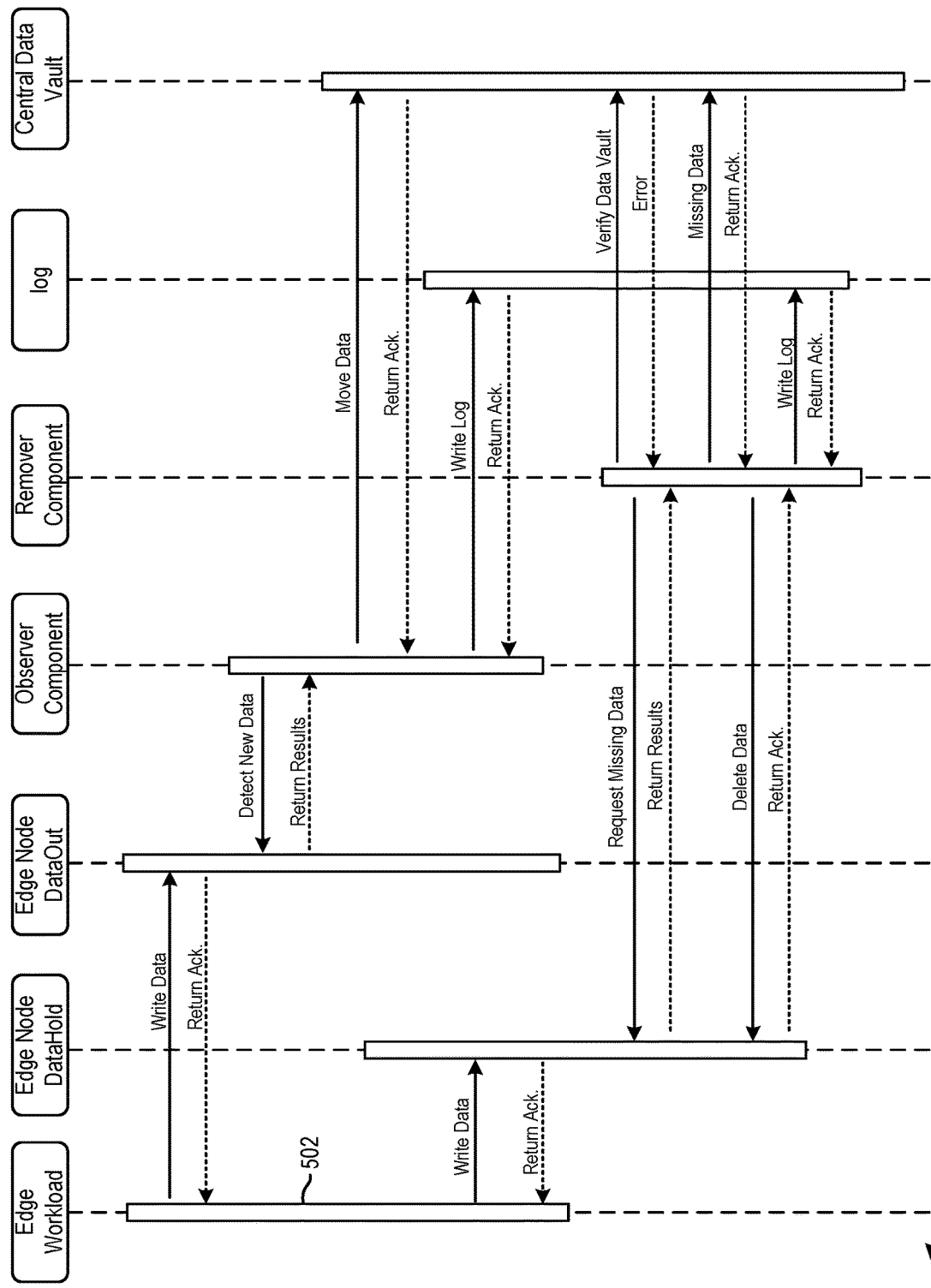
FIG. 5 is a representational operation view of an autonomous procedure, in accordance with one in-use example.

Looking now to FIG. 5, an in-use example of an autonomous procedure 500 that may be implemented between an edge node and a central data vault is shown. For instance, one or more of the operations included in the autonomous procedure 500 may be orchestrated by an archive handler, e.g., as described in approaches herein. It follows that the autonomous procedure 500 may be implemented as software that runs in the background, e.g., in response to detecting new data at an edge node.

Accordingly, operation 502 of procedure 500 includes an edge workload initiating a file synchronization to a central data vault. New data may be received at and/or created at an edge node in a number of situations. For example, new data may be received from one or more sensors, sensor readings may be compiled to create a new video represented as data, sensor readings may be evaluated using one or more trained machine learning models to produce a new analysis of the sensor readings, etc.

As noted above, new data is preferably transferred to a central data vault (e.g., data storage location) in real-time to maintain a mirror copy of data that is received at and/or created at a number of edge nodes that are in communication with the central data vault. However, new data is also preferably kept at the edge node for at least a predetermined amount of time. Accordingly, a first copy of the new data is written to the "DataHold" Edge Node directory, and a second copy of the new data is written to the "DataOut" Edge Node directory. Acknowledgements are returned to the edge workload, confirming receipt of the instructions and/or successful completion of the data write.

In one example, which is in no way intended to limit the invention, the file path for the DataOut Edge Node directory would be:
DataOUT/[NodeID]/[EdgeWorkLoadID]/[DataCat]/filename, while the file path for the DataHold Edge Node directory would be:
DataHolding/[NodeID]/[EdgeWorkLoadID]/[DataCat]/filename. Here, "NodeID" represents the unique identifier of an edge node, while "EdgeWorkLoadID" represents the unique identifier of an edge workload (e.g., a quality inspection). Moreover, "DataCat" indicates that an edge workload can generate multiple types of files. For instance, raw images, annotated images, .json files, etc., from a workload with computer vision AI object detection may be used. DataCat thereby provides a separation of different file types as desired. It follows that a lowest hierarchy folder may be considered to include the [Edge WorkLoad] level or the [DataCat] level. As noted herein, folders at a lowest hierarchy level are also referred to herein as "child folders."

Referring still to FIG. 5, an observer component assigned to the "DataOut" Edge Node directory identifies when new data has been added. In response to detecting new data in the "DataOut" Edge Node directory, the new data is automatically sent to the observer component, and moved to the central data vault. In other words, new data added to the "DataOut" Edge Node directory is automatically copied to the central data vault. An acknowledgement is returned from the central data vault, whereby a remnant copy of the new data at the "DataOut" Edge Node directory may be deleted. In other implementations, the copy of data in the "DataOut" Edge Node directory may be deleted in response to a copy being sent to the central data vault. The observer component also writes to a log, and an acknowledgement (e.g., confirmation) is returned.

In response to a predetermined condition being met (e.g., such as a predetermined amount of time passing since the data was added to the "DataHold" Edge Node directory), the remover component verifies the data stored in the central data vault is complete. As noted above, at least portions of data sent to the central data vault may not be successfully saved in data storage. Accordingly, by verifying whether a complete (mirrored) copy of data is stored at the central data vault, procedure 500 is able to reduce data loss and operational errors resulting from missing or corrupted data. Maintaining a copy of data at the central data vault in real-time also allows for downstream processes (e.g., applications) to operate more efficiently. For example, the real-time mirrored copy of data at the central data vault allows for additional processing to be performed on the data more efficiently than if the data was stored at one or more of the edge nodes. Accordingly, compute intensive operations, such as large (complex) machine learning models, may be performed on any data in a distributed system far more quickly than previously achievable.

Moreover, maintaining a temporary copy of the new data on the edge nodes before removing them allows for data errors experienced at the central data vault to be easily overcome. These temporary backup copies may also be used at the respective edge nodes to perform additional processing there. Accordingly, edge nodes and a central data vault may process the data simultaneously and in parallel, thereby further improving efficiency of the system. In other words, more operations may be performed in a given amount of time as a result of being able to perform operations in parallel, but also as a result of significantly reducing data access times at edge nodes and the central data vault.

Accordingly, in situations where the central data vault indicates that at least some data is missing, the remover component may send a request to the "DataHold" Edge Node directory for the missing data. The "DataHold" Edge Node directory thereby returns the missing data that was requested, which is sent along to the central data vault. Upon verifying that the central data vault includes a complete copy of data, the "DataHold" Edge Node directory is instructed (e.g., permitted) to delete the backup copy of the new data still stored therein. Finally, an acknowledgement is returned to the remover component and the log is updated.

Figure 6:
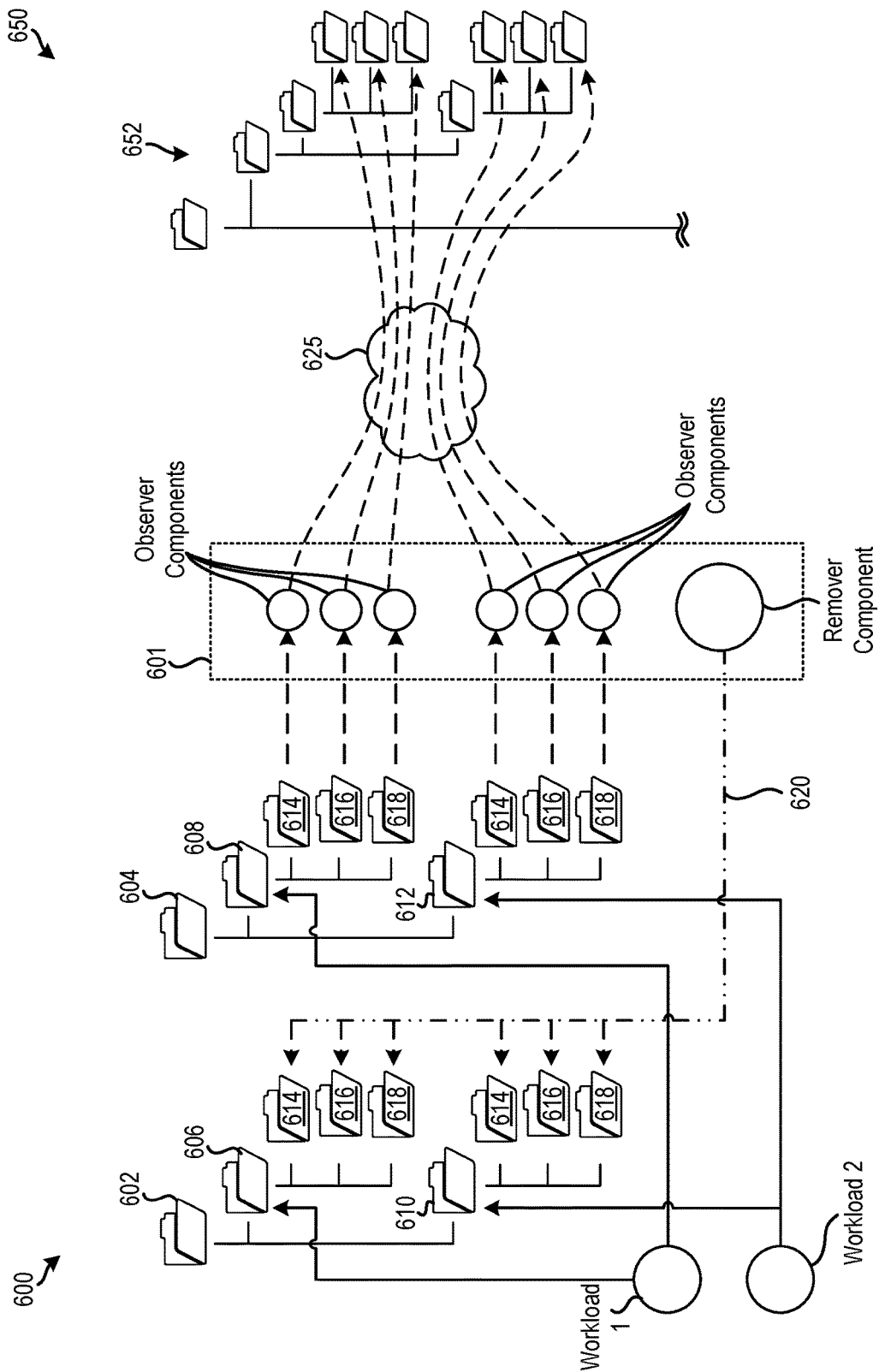
FIG. 6 is a is a representational view of a distributed system, in accordance with one illustrative approach.

Looking now to FIG. 6, a distributed system having an edge node 600 and central data vault 650 are shown in accordance with one illustrative approach. As an option, aspects of the present illustrative approach may be implemented in conjunction with features from any other implementation listed herein, such as those described with reference to the other FIGS., such as FIGS. 1-5. However, the illustrative approach shown in FIG. 6, and others presented herein, may be used in various applications and/or in permutations which may or may not be specifically described in the illustrative approaches listed herein. Further, the illustrative approach presented below may be used in any desired environment. Thus FIG. 6 (and the other FIGS.) may be deemed to include any possible permutation.

As shown in FIG. 6, Workload 1 and Workload 2 are being performed at the edge node 600. As Workload 1 and Workload 2, a first copy of new data is added to the DataHold Edge Node directory 602, while a second copy of the new data is added to the DataOut Edge Node directory 604. Specifically, a first copy of new data produced by Workload 1 is sent to a Workload 1 layer 606 under the DataHold Edge Node directory 602, and a second copy of the new data produced by Workload 1 is sent to a Workload 1 layer 608 under the DataOut Edge Node directory 604. Similarly, Workload 2 sends copies of new data produced to corresponding layers 610, 612 as shown.

Data that is added to the different layers 606, 608, 610, 612 is preferably separated based on type. In other words, data is separated between the different layers 606, 608, 610, 612, such that each layer includes a different type of data accumulated therein. Thus, each of the layers 606, 608, 610, 612 further include a number of directory locations 614, 616, 618, each of which correspond to a different type of data. It should be noted that although each of the directory locations are numbered the same for each of the layers 606, 608, 610, 612, this is in no way intended to be limiting. Rather, any layer at an edge node may include any desired type of data. Accordingly, the number of directory locations may vary and be updated over time as new types of data is received. It should also be noted that directory locations 614, 616, 618 are also referred to as "child folders" in some of the approaches herein.

Referring still to FIG. 6, the directory locations 614, 616, 618 under DataOut Edge Node directory 604 are shown as sending the data stored therein directly to corresponding sections of a filesystem 652 at the remote data vault 650 using network 625. Specifically, dashed arrowed lines are shown as extending from each of the directory locations 614, 616, 618 under DataOut Edge Node directory 604, to the respective observer components of the archive handler 601. It follows that the observer components may be configured to continually monitor the respective directory locations 614, 616, 618 under DataOut Edge Node directory 604 for newly introduced data. In response to identifying new data in one or more of the directory locations, the corresponding observer component preferably automatically pushes the new data to the filesystem 652 at the remote data vault 650 in real-time. The remote data vault 650 is thereby able to maintain an accurate copy of data produced at each edge node of a system.

Additionally, the archive handler 601 includes a remover component. As noted above, the remover component may monitor backup (e.g., temporary) copies of data that are stored in the directory locations 614, 616, 618 under DataHold Edge Node directory 602. In response to a copy of data having been maintained in one of the directory locations 614, 616, 618 under DataHold Edge Node directory 602 for a predetermined amount of time, the remover component sends one or more instructions along dashed lines 620, causing the copy to be removed from the respective directory location. However, before the copy of data is removed from the edge node 600, a verification may be sent to the remote data vault 650 to determine whether a complete and up-to-date mirrored copy of the data received at and/or produced by the edge node 600 (and/or other edge nodes connected to the remote data vault 650) is stored at the remote data vault 650.

Again, approaches herein are desirably able to maintain a mirrored copy of the data that is received and/or produced at various edge nodes, thereby achieving an efficient and scalable data archive scheme across a distributed system. Accordingly, this scheme may be applied to various different types of implementations, e.g., such as enterprise edge node workloads. Approaches herein are also easily scalable, providing support to multiple edge nodes and multiple edge workloads, even in large enterprise settings.

Performance of a system is also improved by implementing an archive handler that can be easily deployed as a containerized edge workload to various edge nodes. This helps make data available for downstream consumption in real-time, while also protecting the edge node from unnecessary access. Data is kept available at the edge nodes as long as is desired, e.g., as determined in a number of different ways as described herein. This further minimizes the cost of storage at each of the edge nodes.

Again, approaches herein have significantly improved data retention by maintaining a complete and up-to-date copy of data from a number of edge nodes, at a central location. Maintaining a full copy of the data at a central and accessible location also significantly improves the efficiency at which the system as a whole is able to operate by providing quicker access to data. As noted above, data produced at an edge node may be requested downstream at different locations of a distributed system, e.g., to perform additional processing. Accordingly, by sending copies of data to the central data storage location from the edge nodes in real-time as the data is received and/or generated, the central data storage location is able to satisfy operations and requests that pertain to data from one or more edge nodes.

Certain aspects of the implementations described herein may further be improved as a result of implementing one or more machine learning models. These machine learning models may be trained to generate the desired amount of time that a backup copy of data sent to a central remote vault, is kept at the edge node (e.g., see DataHold Edge Node directory 602 of FIG. 6 above). For instance, a machine learning model (e.g., a neural network) may be trained using labeled and/or unlabeled data corresponding to past performance of a distributed system implementing any of the processes described herein. Over time, the machine learning model may thereby be able to identify when the backup copies of data sent to the central data vault are referenced. This understanding will allow the machine learning model to determine an ideal amount of time to keep each copy of data in storage at the respective edge nodes. The machine learning model achieves this by balancing the impact each copy has on data storage capacity at the edge node, with the amount of data errors that are experienced at the central data vault and/or additional processing that is performed on data stored at the edge nodes, e.g., as would be appreciated by one skilled in the art after reading the present description.

It should also be noted that implementations herein may use an application program interface (API) that is configured to collect the outputs (e.g., vectors) of a layer that are to be used as an input for a subsequent layer of a process, e.g., such as a machine learning model. Accordingly, the API can accomplish a seamless transition of data between the layers in edge servers and the central server. APIs may thereby be used to help facilitate the movement of data and flow of a method, e.g., as would be appreciated by one skilled in the art after reading the present description. The definition of the parameters to be passed between servers is made generic in the API so that it can accommodate all tensors of different sizes based on the size of the output layer of each server.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   detecting new data generated at a first edge node;
   causing a first copy of the new data to be transferred to a central data storage location in real-time;
   causing a second copy of the new data to be stored in a first location at the first edge node;
   sending, to the central data storage location, a request to determine whether a first storage location at the central data storage location includes a mirrored duplicate of the first copy of the new data; and
   in response to receiving a determination that the first storage location includes a mirrored duplicate of the first copy of the new data, releasing the second copy of the new data from the first edge node.

2. The computer-implemented method of claim 1, wherein the computer-implemented method is performed by an archive handler, wherein the archive handler includes a set of observers and a remover.

3. The computer-implemented method of claim 2, wherein the detecting new data generated at the first edge node includes an observer from the set of observers identifying the new data being written into a folder that corresponds to the observer, wherein the first copy of the new data is transferred to the central data storage location in real-time by the observer, wherein the second copy of the new data is stored in the first location at the first edge node by the observer.

4. The computer-implemented method of claim 3, comprising:
   in response to a predetermined condition being met, determining whether any information in the first copy of the new data transferred is missing at the central data storage location;
   in response to determining that no information in the first copy of the new data transferred is missing at the central data storage location, causing the second copy of the new data to be removed from the first location at the first edge node;
in response to determining that at least some information in the first copy of the new data is missing at the central data storage location, transferring, by the observer, the missing information to the central data storage location; and
removing the first copy of the new data from the first location in response to transferring the missing information to the central data storage location.

5. The computer-implemented method of claim 2, wherein the archive handler is configured to manage an edge file hierarchy at the first edge node.

6. The computer-implemented method of claim 5, wherein the observers in the set of observers correspond to respective folders at the first edge node, wherein the new data generated at the first edge node is detected in response to receiving a notification from the observer.

7. The computer-implemented method of claim 5, wherein releasing the second copy of the new data to be removed from the first location at the first edge node includes sending one or more instructions to the remover, the one or more instructions causing the remover component to remove the second copy of the new data from the first location.

8. The computer-implemented method of claim 4, wherein meeting the predetermined condition includes maintaining the second copy of the new data in the first location at the first edge node for a first predetermined amount of time.

9. The computer-implemented method of claim 8, wherein the first predetermined amount of time is based at least in part on a type and/or amount of information included in the second copy of the new data.

10. A computer program product, comprising a computer readable storage medium having program instructions embodied therewith, the program instructions readable by a processor, executable by the processor, or readable and executable by the processor, to cause the processor to:
  detect new data generated at a first edge node;
  cause a first copy of the new data to be transferred to a central data storage location in real-time;
  cause a second copy of the new data to be stored in a first location at the first edge node;
  send, to the central data storage location, a request to determine whether a first storage location at the central data storage location includes a mirrored duplicate of the first copy of the new data; and
  in response to receiving a determination that the first storage location includes a mirrored duplicate of the first copy of the new data, release the second copy of the new data from the first edge node.

11. The computer program product of claim 10, wherein the central data storage location is configured to receive and store one or more additional copies of data received from one or more additional edge nodes, wherein the central data storage location is configured to maintain real-time mirrored copies of data that is received at the respective one or more additional edge nodes.

12. The computer program product of claim 10, wherein the detecting new data generated at the first edge node includes an observer identifying the new data being written into a folder that corresponds to the observer, wherein the first copy of the new data is transferred to the central data storage location in real-time by the observer, wherein the second copy of the new data is stored in the first location at the first edge node by the observer, wherein the observer is from a set of observers in an archive handler.

13. The computer program product of claim 10, wherein the program instructions are readable and/or executable by the processor to cause the processor to:
  in response to a predetermined condition being met, determine whether any information in the first copy of the new data transferred is missing at the central data storage location;
  in response to determining that no information in the first copy of the new data transferred is missing at the central data storage location, cause the second copy of the new data to be removed from the first location at the first edge node;
  in response to determining that at least some information in the first copy of the new data is missing at the central data storage location, transfer the missing information to the central data storage location; and
  remove the first copy of the new data from the first location in response to transferring the missing information to the central data storage location.

14. The computer program product of claim 12, wherein the archive handler is configured to manage an edge file hierarchy at the first edge node, wherein the archive handler includes the set of observer components and a remover component.

15. The computer program product of claim 14, wherein the observers in the set of observers correspond to respective folders at the first edge node, wherein the new data generated at the first edge node is detected in response to receiving a notification from a respective one of the observer components.

16. The computer program product of claim 14, wherein causing the first copy of the new data to be removed from the first location at the first edge node includes sending one or more instructions to the remover component, the one or more instructions causing the remover component to remove the first copy from the first location.

17. The computer program product of claim 10, wherein meeting the predetermined condition includes maintaining the first copy of the new data in the first location at the first edge node for a first predetermined amount of time.

18. The computer program product of claim 17, wherein the first predetermined amount of time is based at least in part on a type and/or amount of information included in the first copy of the new data.

19. A system, comprising:
  a first edge node connected to a central data storage location;
  a processor; and
  logic integrated with the processor, executable by the processor, or integrated with and executable by the processor, the logic being configured to:
  detect new data generated at a first edge node;
  cause a first copy of the new data to be transferred to a central data storage location in real-time;
  cause a second copy of the new data to be stored in a first location at the first edge node;
  send, to the central data storage location, a request to determine whether a first storage location at the central data storage location includes a mirrored duplicate of the first copy of the new data; and
  in response to receiving a determination that the first storage location includes a mirrored duplicate of the first copy of the new data, release the second copy of the new data from the first edge node.

20. The system of claim 19,
wherein the central data storage location is configured to receive and store one or more additional copies of data received from one or more additional edge nodes, wherein the central data storage location is configured to maintain real-time mirrored copies of data that is received at the respective one or more additional edge nodes.

21. A computer program product, comprising a computer readable storage medium having program instructions embodied therewith, the program instructions readable by a processor, executable by the processor, or readable and executable by the processor, to cause the processor to:
receive a first copy of data from a first edge node;
store the first copy of data in a first storage location at a central data storage location;
receive a second copy of data from a second edge node;
store the second copy of data in a second storage location at the central data storage location;
receive a request from the first edge node to determine whether the first storage location includes a mirrored duplicate of the first copy of data received from the first edge node; and
in response to determining that the first storage location includes a mirrored duplicate of the first copy of data, cause the first copy of data to be released from the first edge node by sending an acknowledgement to the first edge node.

22. The computer program product of claim 21, wherein the program instructions are readable and/or executable by the processor to cause the processor to:
in response to determining that the first storage location does not include a mirrored duplicate of the first copy of data, issue a request to the first edge node for missing portions of the first copy of data;
receive the missing portions of the first copy of data; and
use the missing portions to complete the mirrored duplicate of the first copy of data at the first storage location.

23. The computer program product of claim 21, wherein the program instructions are readable and/or executable by the processor to cause the processor to:
receive a request from the second edge node to determine whether the second storage location includes a mirrored duplicate of the second copy of data received from the second edge node; and
in response to determining that the second storage location includes a mirrored duplicate of the second copy of data, cause the second copy of data to be released from the second edge node by sending an acknowledgement to the second edge node.

24. The computer program product of claim 23, wherein the program instructions are readable and/or executable by the processor to cause the processor to:
in response to determining that the second storage location does not include a mirrored duplicate of the second copy of data, issue a request to the second edge node for missing portions of the second copy of data;
receive the missing portions of the second copy of data; and
use the missing portions to complete the mirrored duplicate of the second copy of data at the second storage location,
wherein the first storage location is in non-volatile memory at the central data storage location, wherein the second storage location is in non-volatile memory at the central data storage location.

25. A system, comprising:
a central data storage location connected to a first edge node and a second edge node;
a processor; and
logic integrated with the processor, executable by the processor, or integrated with and executable by the processor, the logic being configured to:
receive a first copy of data from a first edge node;
store the first copy of data in a first storage location at the central data storage location;
receive a second copy of data from a second edge node;
store the second copy of data in a second storage location at the central data storage location;
receive a request from the first edge node to determine whether the first storage location includes a mirrored duplicate of the first copy of data received from the first edge node; and
in response to determining that the first storage location includes a mirrored duplicate of the first copy of data, cause the first copy of data to be released from the first edge node by sending an acknowledgement to the first edge node.

* * * * *